(12) United States Patent
Park et al.

(10) Patent No.: US 10,349,084 B2
(45) Date of Patent: Jul. 9, 2019

(54) VIDEO ENCODING METHOD USING INTER-VIEW PREDICTION AND DEVICE THEREOF, AND VIDEO DECODING METHOD AND DEVICE THEREOF

(71) Applicant: SAMSUNG ELECTRONICS CO., LTD., Suwon-si (KR)

(72) Inventors: Min-woo Park, Yongin-si (KR);
Jin-young Lee, Hwaseong-si (KR);
Ho-cheon Wey, Seongnam-si (KR);
Yong-jin Cho, Seoul (KR);
Byeong-doo Choi, Suwon-si (KR)

(73) Assignee: SAMSUNG ELECTRONCIS CO., LTD., Suwon-si (KR)

( * ) Notice: Subject to any disclaimer, the term of this patent is extended or adjusted under 35 U.S.C. 154(b) by 212 days.

(21) Appl. No.: 15/186,883

(22) Filed: Jun. 20, 2016

(65) Prior Publication Data

US 2016/0309185 A1 Oct. 20, 2016

Related U.S. Application Data

(63) Continuation of application No. PCT/KR2014/012668, filed on Dec. 22, 2014.
(Continued)

(51) Int. Cl.
*H04N 19/597* (2014.01)
*H04N 19/176* (2014.01)
(Continued)

(52) U.S. Cl.
CPC ......... *H04N 19/597* (2014.11); *H04N 19/176* (2014.11); *H04N 19/513* (2014.11); *H04N 19/625* (2014.11)

(58) Field of Classification Search
CPC .................................................. H04N 19/597
See application file for complete search history.

(56) References Cited

U.S. PATENT DOCUMENTS

| 8,494,046 | B2 * | 7/2013 | Yang | ................... | H04N 19/597 |
| | | | | | 375/240.02 |
| 2009/0022222 | A1 * | 1/2009 | He | ....................... | H04N 19/597 |
| | | | | | 375/240.12 |

(Continued)

FOREIGN PATENT DOCUMENTS

| KR | 10-1039204 B1 | 6/2011 |
| KR | 10-2012-0018906 A2 | 3/2012 |

(Continued)

OTHER PUBLICATIONS

International Search Report dated Mar. 12, 2015 issued by the International Searching Authority in counterpart International Application No. PCT/KR2014/012668 (PCT/ISA/210).

(Continued)

*Primary Examiner* — Obafemi O Sosanya
(74) *Attorney, Agent, or Firm* — Sughrue Mion, PLLC

(57) ABSTRACT

An inter-view video decoding method may include determining a disparity vector of a current second-view depth block by using a specific sample value selected within a sample value range determined based on a preset bit-depth, detecting a first-view depth block corresponding to the current second-view depth block by using the disparity vector, and reconstructing the current second-view depth block by generating a prediction block of the current second-view depth block based on coding information of the first-view depth block.

11 Claims, 22 Drawing Sheets

Related U.S. Application Data

(60) Provisional application No. 61/919,061, filed on Dec. 20, 2013.

(51) Int. Cl.
H04N 19/513 (2014.01)
H04N 19/625 (2014.01)

(56) References Cited

U.S. PATENT DOCUMENTS

2014/0192154 A1 7/2014 Jeong et al.
2015/0030087 A1* 1/2015 Chen .................. H04N 19/597
375/240.27

FOREIGN PATENT DOCUMENTS

KR 10-2013-0018629 A 2/2013
WO 2013053309 A1 4/2013
WO 2013/068547 A2 5/2013

OTHER PUBLICATIONS

Written Opinion dated Mar. 12, 2015 issued by the International Searching Authority in counterpart International Application No. PCT/KR2014/012668 (PCT/ISA/237).

Min Woo Park, et al; "Proposed text of 3D-HEVC Test Model for JCT3V-E0142"; Joint Collaborative Team on 3D Video Coding Extensions of ITU-T SG 16 WP 3 and ISO/IEC JTC 1/SC 29/WG 11; Jul. 27-Aug. 2, 2013; Document JCT3V-E0142_WD; 6 pgs. total.

Communication dated Jul. 3, 2017 issued by the European Patent Office in counterpart European Patent Application No. 14870937.1.

Min Woo Park et al; "3D-CE2.h related: Simplification of disparity vector derivation"; Joint Collaborative Team on 3D Video Coding Extensions of ITU-T SG 16 WP 3 and ISO/IEC JTC 1/SC 29/WG 11; Document: JCT3V-D0113; Apr. 20-26, 2013; 4 pgs. total.

Gerhard Tech et al; "3D-HEVC Test Model 3"; Joint Collaborative Team on 3D Video Coding Extension Development of ITU-T SG 16 WP 3 and ISO/IEC JTC 1/SC 29/WG 11; Document: JCT3V-C1005-d0; Jan. 17-23, 2013; 51 pgs. total.

Min Woo Park et al; "3D-CE2.h related: Simplified NBDV and improved disparity vector derivation"; Joint Collaborative Team on 3D Video Coding Extensions of ITU-T SG 16 WP 3 and ISO/IEC JTC 1/SC 29/WG 11; Document: JCT3V-E0142; Jul. 27-Aug. 2, 2013; 9 pgs. total.

Gerhard Tech et al; "3D-HEVC Test Model 4"; Joint Collaborative Team on 3D Video Coding Extension Development of ITU-T SG 16 WP 3 and ISO/IEC JTC 1/SC 29/WG 11; Document: JCT3V-D1005v1; Apr. 20-26, 2013; 52 pgs. total.

* cited by examiner

FIG. 5

51 { MvDisp[ x ][ y ] = ( DepthToDisparityB[ DefaultRefViewIdx ][ 1 << ( BitDepthY − 1 ) ], 0 )    (I−306)
    MvRefinedDisp[ x ][ y ] = ( DepthToDisparityB[ DefaultRefViewIdx ][ 1 << ( BitDepthY − 1 ) ], 0 )    (I−307)

RefViewIdx[ x ][ y ] = DefaultRefViewIdx    (I−308)

52

DispAvailabilityFlag[ x ][ y ] = 1    (I−309)

FIG. 6

62 { MvRefinedDisp[ x ][ y ] = (0, 0) —61
    RefViewIdx[ x ][ y ] = 0

PARTITION MODE (800)

PREDICTION MODE (810)

SIZE OF TRANSFORMATION UNIT (820)

CODING UNIT (1010)

VIDEO ENCODING METHOD USING INTER-VIEW PREDICTION AND DEVICE THEREOF, AND VIDEO DECODING METHOD AND DEVICE THEREOF

CROSS REFERENCE TO RELATED APPLICATION

This is a bypass continuation of International Application No. PCT/KR2014/012668 filed on Dec. 22, 2014, and claims priority from U.S. Provisional Application No. 61/919,061, filed on Dec. 20, 2013, the entire disclosures of which are incorporated herein by reference in their entireties.

TECHNICAL FIELD

The present invention relates to a video encoding method and a video decoding method using inter-view prediction and, more particularly, to a method of determining a disparity vector used for inter-view video encoding and decoding.

BACKGROUND ART

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on coding units of a tree structure.

Image data of a spatial domain is transformed into coefficients of a frequency domain via frequency transformation. According to a video codec, an image is split into blocks having a predetermined size, discrete cosine transformation (DCT) is performed on each block, and frequency coefficients are encoded in block units, for rapid calculation of frequency transformation. Compared with image data of the spatial domain, coefficients of the frequency domain are easily compressed. In particular, since an image pixel value of the spatial domain is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

A multiview video codec encodes/decodes a first-view video and one or more second-view videos. By removing temporal/spatial redundancy of the first-view and second-view videos and redundancy between views, the amount of data of the first-view and second-view videos may be reduced.

DETAILED DESCRIPTION OF THE INVENTION

Technical Problem

The present invention provides an inter-view video encoding method and an apparatus therefor, and an inter-view video decoding method and an apparatus therefor, the methods and apparatuses being capable of reducing complexity of calculation by improving a method of determining a disparity vector used to perform inter-view prediction on a multiview image.

Technical Solution

An inter-view video decoding method according to various embodiments includes determining a disparity vector of a current second-view depth block by using a specific sample value selected within a sample value range determined based on a preset bit-depth, detecting a first-view depth block corresponding to the current second-view depth block by using the disparity vector, and reconstructing the current second-view depth block by generating a prediction block of the current second-view depth block based on coding information of the first-view depth block.

Advantageous Effects of the Invention

Complexity of calculation for encoding/decoding a multiview image may be reduced by improving a method of determining a disparity vector used to perform inter-view prediction on the multiview image.

DESCRIPTION OF THE DRAWINGS

FIG. 5 is a diagram for describing a method of inducing a disparity vector by using a preset bit-depth, according to various embodiments.

FIG. 6 is a diagram for describing a method of determining a disparity vector by using a preset value, according to various embodiments.

BEST MODE

Figure 1A:
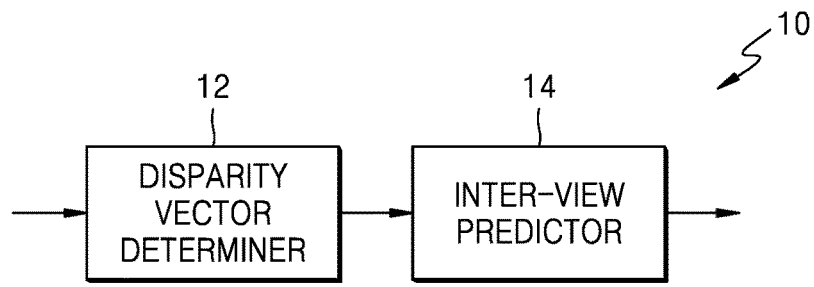
FIG. 1A is a block diagram of an inter-view video encoding apparatus according to various embodiments.

According to an aspect of the present invention, an inter-view video decoding method includes determining a disparity vector of a current second-view depth block by using a specific sample value selected within a sample value range determined based on a preset bit-depth, detecting a first-view depth block corresponding to the current second-view depth block by using the disparity vector, and reconstructing the current second-view depth block by generating a prediction block of the current second-view depth block based on coding information of the first-view depth block.

The selected specific sample value may be a median value among values included in the sample value range.

The reconstructing of the current second-view depth block may include obtaining motion information of the current second-view depth block by using motion information of the first-view depth block, and reconstructing the current second-view depth block by performing motion compensation by using the motion information of the current second-view depth block.

The reconstructing of the current second-view depth block may include reconstructing the current second-view depth block by performing disparity compensation by using the first-view depth block.

The bit-depth may be set to 8 bits, the sample value range may be set to 0 to 255, and the selected specific sample value may be a median value among values included in the sample value range, i.e., 128.

According to another aspect of the present invention, an inter-view video decoding apparatus includes a disparity vector determiner for determining a disparity vector of a current second-view depth block by using a specific sample value selected within a sample value range determined based on a preset bit-depth, and an inter-view compensator for detecting a first-view depth block corresponding to the current second-view depth block by using the determined disparity vector, and reconstructing the current second-view depth block by generating a prediction block of the current second-view depth block based on coding information of the first-view depth block.

The selected specific sample value may be a median value among values included in the sample value range.

The inter-view compensator may obtain motion information of the current second-view depth block by using motion information of the first-view depth block, and reconstruct the current second-view depth block by performing motion compensation by using the motion information of the current second-view depth block.

The inter-view compensator may reconstruct the current second-view depth block by performing disparity compensation by using the first-view depth block.

The bit-depth may be set to 8 bits, the sample value range may be set to 0 to 255, and the selected specific sample value may be a median value among values included in the sample value range, i.e., 128.

According to another aspect of the present invention, an inter-view video encoding method includes determining a disparity vector of a current second-view depth block by using a specific sample value selected within a sample value range determined based on a preset bit-depth, detecting a first-view depth block corresponding to the current second-view depth block by using the determined disparity vector, and encoding the current second-view depth block by generating a prediction block of the current second-view depth block based on coding information of the first-view depth block.

The selected specific sample value may be a median value among values included in the sample value range.

The encoding of the current second-view depth block may include obtaining motion information of the current second-view depth block by using motion information of the first-view depth block, and encoding the current second-view depth block by performing motion prediction by using the motion information of the current second-view depth block.

The encoding of the current second-view depth block may include encoding the current second-view depth block by performing disparity prediction by using the first-view depth block.

The bit-depth may be set to 8 bits, the sample value range may be set to 0 to 255, and the selected specific sample value may be a median value among values included in the sample value range, i.e., 128.

According to another aspect of the present invention, an inter-view video encoding apparatus includes a disparity vector determiner for determining a disparity vector of a current second-view depth block by using a specific sample value selected within a sample value range determined based on a preset bit-depth, and an inter-view predictor for detecting a first-view depth block corresponding to the current second-view depth block by using the determined disparity vector, and encoding the current second-view depth block by generating a prediction block of the current second-view depth block based on coding information of the first-view depth block.

The selected specific sample value may be a median value among values included in the sample value range.

The inter-view predictor may obtain motion information of the current second-view depth block by using motion information of the first-view depth block, and encode the current second-view depth block by performing motion prediction by using the motion information of the current second-view depth block.

The inter-view predictor may encode the current second-view depth block by performing disparity prediction by using the first-view depth block.

The bit-depth may be set to 8 bits, the sample value range may be set to 0 to 255, and the selected specific sample value may be a median value among values included in the sample value range, i.e., 128.

MODE OF THE INVENTION

Hereinafter, an inter-view video encoding method and an inter-view video decoding method using inter-view prediction according to various embodiments will be described with reference to FIGS. 1A to 6. In addition, a video encoding method and a video decoding method based on coding units having a tree structure, which are applicable to the above-mentioned inter-view video encoding and decoding methods, according to various embodiments will be described with reference to FIGS. 7 to 19. Furthermore, various embodiments to which the above-mentioned video encoding and decoding methods are applicable will be described with reference to FIGS. 20 to 26.

In the following description, the term 'image' may refer to a still image of a video, or a moving image, i.e., the video itself. In addition, the 'image' may include a depth image. The depth image refers to an image including depth information.

The term 'sample' refers to data assigned to an image sampling location and to be processed. For example, pixels of an image of the spatial domain may be samples.

Descriptions are now given of an inter-view video encoding apparatus and an inter-view video encoding method, and an inter-view video decoding apparatus and an inter-view video decoding method with reference to FIGS. 1A to 6.

Figure 1B:
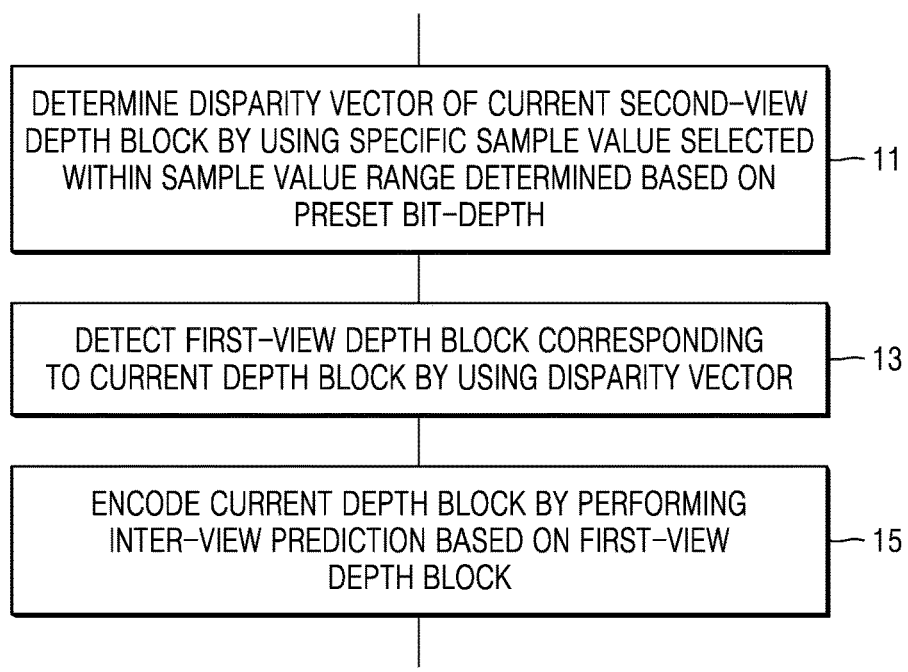
FIG. 1B is a flowchart of an inter-view video encoding method according to various embodiments.

FIG. 1A is a block diagram of an inter-view video encoding apparatus 10 according to various embodiments. FIG. 1B is a flowchart of an inter-view video encoding method according to various embodiments.

The inter-view video encoding apparatus 10 according to various embodiments may include a disparity vector determiner 12 and an inter-view predictor 14.

The inter-view video encoding apparatus 10 according to various embodiments may perform inter prediction to predict a current image with reference to other images within a single view. Due to inter prediction, a motion vector indicating motion information between the current image and a reference image, and a residual component between the current image and the reference image may be generated.

In addition, the inter-view video encoding apparatus 10 may perform inter-view prediction to predict prediction information of second-view images with reference to prediction information of first-view images.

Alternatively, when three or more views, e.g., a first view, a second view, and a third view are allowed, the inter-view video encoding apparatus 10 according to an embodiment may perform inter-view prediction between a first-view image and a third-view image and between a second-view image and the third-view image based on a multiview prediction structure.

Due to inter-view prediction, a location difference component and a residual component between a current image and a reference image of another view may be generated.

The inter-view video encoding apparatus 10 according to various embodiments encodes each image of a video per block, in each view. The block may have a square shape, a rectangular shape, or a geometric shape, and is not limited to a certain-sized data unit. The block may be a largest coding unit, a coding unit, a prediction unit, a transformation unit, or the like among coding units having a tree structure. The largest coding unit including coding units having a tree structure may be variously named as a coding tree unit, a coding block tree, a block tree, a root block tree, a coding tree, a coding root, or a tree trunk. A video encoding/decoding method based on coding units having a tree structure will be described below with reference to FIGS. 7 to 19.

Inter prediction and inter-view prediction may be performed based on a data unit such as a coding unit, a prediction unit, or a transformation unit.

The inter-view video encoding apparatus 10 according to various embodiments may generate symbol data by performing a source coding operation including inter prediction or intra prediction, on first-view images. The symbol data indicates a sample value of each coding parameter and a sample value of a residual.

For example, the inter-view video encoding apparatus 10 may generate symbol data by performing inter prediction or intra prediction, transformation, and quantization on samples of data units of the first-view images, and generate a first-view stream by performing entropy encoding on the symbol data.

In addition, the inter-view video encoding apparatus 10 may encode second-view images based on coding units having a tree structure. A second-view encoder may generate symbol data by performing inter/intra prediction, transformation, and quantization on samples of coding units of the second-view images, and generate a second-view stream by performing entropy encoding on the symbol data.

The second-view encoder according to various embodiments may perform inter-view prediction to predict a second-view image by using prediction information of a first-view image. To encode an original second-view image of a second-view video sequence by using an inter-view prediction structure, the second-view encoder may determine prediction information of a current second-view image by using prediction information of a first-view reconstruction image, generate a second-view prediction image based on the determined prediction information, and encode a prediction error between the original second-view image and the second-view prediction image.

The inter-view video encoding apparatus 10 may perform inter prediction on the second-view image per block, e.g., a coding unit or a prediction unit. That is, a block of the first-view image to be referred by a block of the second-view image may be determined. For example, a reconstruction block of the first-view image provided at a location corresponding to the location of a current block of the second-view image may be determined. The inter-view video encoding apparatus 10 may determine a second-view prediction block by using the first-view reconstruction block corresponding to the second-view block.

The inter-view video encoding apparatus 10 may perform transformation, quantization, and entropy encoding on an error between a sample value of the prediction block and a sample value of the original second-view block, i.e., a residual component generated due to inter-view prediction.

The inter-view video encoding apparatus 10 according to various embodiments may encode a depth image. The depth image refers to an image including depth information between views.

The inter-view video encoding apparatus 10 may encode the depth image by performing inter prediction or inter-view prediction. For example, the inter-view video encoding apparatus 10 may use a first-view reconstruction depth image to encode a second-view depth image.

To obtain a prediction block of a current second-view depth block based on a first-view depth block, the inter-view video encoding apparatus 10 may determine a disparity vector of the current second-view depth block, the disparity vector indicating the first-view depth block.

For example, the inter-view video encoding apparatus 10 may determine the disparity vector not by using peripheral blocks of the current second-view depth block but by using one of sample values of a sample value range determined based on a bit-depth.

In addition, the inter-view video encoding apparatus 10 may improve encoding/decoding efficiency by performing an operation for removing dependency between the current depth block and the peripheral depth blocks and determining the disparity vector of the current depth block, and an operation for determining disparity vectors of the peripheral depth blocks, in parallel.

The inter-view video encoding apparatus 10 may detect a first-view depth block indicated by the disparity vector obtained on the basis of the location of the current second-view depth block. In addition, the inter-view video encoding apparatus 10 may obtain time direction motion information from the detected depth block, and set the obtained time direction motion information as time direction motion information of the current depth block. The motion information may include reference direction information, an index for identifying a reference picture in a reference list, a motion vector, etc.

The inter-view video encoding apparatus 10 may obtain a prediction block of the current second-view depth block based on the set motion information. The inter-view video encoding apparatus 10 may perform transformation, quantization, and entropy encoding on an error between a sample value of the prediction block and a sample value of the second-view depth block, i.e., a residual component due to inter-view prediction.

As described above, the inter-view video encoding apparatus 10 may encode a current-view video sequence with reference to first-view reconstruction images by using an inter-view prediction structure. However, the inter-view video encoding apparatus 10 according to various embodiments may encode the second-view video sequence based on a single-view prediction structure without reference to other-view samples. Accordingly, it should not be construed that the inter-view video encoding apparatus 10 always encodes the second-view video sequence by performing inter prediction based on an inter-view prediction structure.

A detailed description is now given of operation of the inter-view video encoding apparatus 10 with reference to FIG. 1B.

FIG. 1B is a flowchart of an inter-view video encoding method according to various embodiments.

The inter-view video encoding apparatus 10 according to an embodiment may perform inter-view prediction on a current second-view depth block. To perform inter-view prediction on the current second-view depth block, the inter-view video encoding apparatus 10 may determine a disparity vector of the current second-view depth block. A depth block is a block indicating depth information of an image, and sample values included in the depth block may indicate depth values of the image.

In operation 11, the disparity vector determiner 12 may select a specific sample value within a sample value range determined based on a preset bit-depth, and determine a disparity vector of a current depth block by using the selected specific sample value.

The disparity vector determiner 12 may obtain the bit-depth which is preset for the current depth block. For example, the disparity vector determiner 12 may obtain the bit-depth which is preset in view units, slice units, or picture units.

The disparity vector determiner 12 may determine the sample value range of the current depth block based on the preset bit-depth. For example, if the bit-depth is set to 8 bits, the disparity vector determiner 12 may determine the sample value range of the current depth block to 0 to 255. Otherwise, if the bit-depth is set to 4 bits, the disparity vector determiner 12 may determine the sample value range of the current depth block to 0 to 15. The bit-depth is not limited to the above-mentioned examples and may be set to various numbers of bits. The disparity vector determiner 12 may variously determine the sample value range of the current depth block based on the preset bit-depth.

The disparity vector determiner 12 may determine a representative sample value within the sample value range of the current depth block. For example, the disparity vector determiner 12 may determine a median value among values included in the sample value range of the current depth block, as the representative sample value. For example, if the disparity vector determiner 12 determines the sample value range of the current depth block to 0 to 255, the disparity vector determiner 12 may determine a median value among 0 to 255, i.e., 128, as the representative sample value.

The disparity vector determiner 12 may determine the disparity vector of the current depth block based on the selected representative sample value. For example, the disparity vector determiner 12 may determine the disparity vector by applying a scale factor and an offset value to the selected representative sample value.

$$A=(S*V+O)>>N \qquad \text{Equation 1}$$

According to an embodiment, the disparity vector determiner 12 may determine a horizontal component Dx of the disparity vector by using Equation 1. In this case, A denotes the horizontal component Dx of the disparity vector, S denotes the scale factor, O denotes the offset value, and N denotes a shift parameter. The scale factor and the offset value may be determined based on a camera parameter, and the shift parameter may be set based on accuracy (e.g., sub-pixel accuracy) of the preset disparity vector. The value of a vertical component Dy of the disparity vector may be determined to 0.

According to another embodiment, the disparity vector determiner 12 may determine the vertical component Dy of the disparity vector by using Equation 1. In this case, A may indicate the vertical component Dy of the disparity vector, and the value of the horizontal component Dx of the disparity vector may be determined to 0.

The disparity vector determiner 12 may determine whether A denotes the horizontal component Dx of the disparity vector, in various manners. For example, the disparity vector determiner 12 may determine whether A denotes the horizontal component Dx of the disparity vector, based on information acquired from the camera parameter.

According to another embodiment, the disparity vector determiner 12 may preset the disparity vector to (0,0). The disparity vector determiner 12 may improve inter-view video encoding efficiency by presetting the disparity vector to (0,0). However, (0,0) mentioned above is merely an example and the disparity vector determiner 12 may preset the disparity vector to a variety of values.

In addition, the disparity vector determiner 12 may induce the disparity vector in view units, slice units, or picture units by using the camera parameter and the bit-depth set in view units, slice units, or picture units. The disparity vector determiner 12 may improve inter-layer video encoding efficiency by inducing the disparity vector in units larger than depth block units.

In operation 13, the inter-view predictor 14 according to an embodiment may detect a first-view depth block corresponding to the current depth block by using the disparity vector.

The inter-view predictor 14 may detect the first-view depth block corresponding to the current depth block in a depth map of a first-view image corresponding to a current depth map, by using the disparity vector and the location of the current depth block.

For example, the inter-view predictor 14 may determine a first-view depth location pixel indicated by the disparity vector on the basis of a center pixel of the current block, and detect a block including the first-view depth location pixel, as the first-view depth block corresponding to the current block.

The inter-view predictor 14 may obtain the center pixel of the current block in various manners. For example, the inter-view predictor 14 may determine the location of the center pixel of the current block by using a top-left pixel location (Bx, By) of the current depth block, a width W of the current depth block, and a height H of the current depth block on the basis of the depth map. For example, the inter-view predictor 14 may determine a location (X,Y) of the center pixel of the current block to (Bx+(W>>1), By+(H>>1)).

In addition, the inter-view predictor 14 may obtain the first-view depth location pixel indicated by the disparity vector on the basis of the center pixel of the current block.

$$(M,N) = (X + ((Dx+2) >> 2), Y + ((Dy+2) >> 2)) \quad \text{Equation 2}$$

For example, if accuracy of the disparity vector is quarter-pel (¼-pixel) accuracy, the inter-view predictor 14 may determine a first-view depth location pixel (M,N) by applying the location (X,Y) of the center pixel and the disparity vector (Dx, Dy) to Equation 2. Furthermore, if the determined first-view depth location pixel (M,N) indicates a pixel outside a boundary of the current depth map, the inter-view predictor 14 may perform a clipping operation.

The inter-view predictor 14 may detect a block including the determined first-view depth location pixel (M,N), as the first-view depth block corresponding to the current block.

In addition, the inter-view predictor 14 may add a preset value to the disparity vector to obtain a new disparity vector. The inter-view predictor 14 may detect the first-view depth block corresponding to the current depth block by using the new disparity vector.

For example, the inter-view predictor 14 may detect the first-view depth block corresponding to the current depth block by applying the new disparity vector to the above-described method.

The preset value may be set based on encoder, profile, decoder, or video codec standards. However, the preset value is not limited thereto and may be set in various manners.

In operation 15, the inter-view predictor 14 according to an embodiment may perform inter-view prediction on the depth block of the second-view image by using the detected first-view depth block.

The inter-view predictor 14 may obtain coding information of the first-view depth block from the detected first-view depth block. The coding information of the first-view depth block may include information used to perform inter prediction on the first-view depth block. For example, the coding information may include a time direction motion vector of the first-view depth block, disparity vector information of the first-view depth block, a reference picture index of the first-view depth block, or reference direction information of the first-view depth block, or any combination thereof.

As an example of inter-view prediction, the inter-view predictor 14 may obtain time direction motion information from the first-view depth block and set the obtained time direction motion information as time direction motion information of the current depth block or as time direction motion information candidates of a merge mode of the current depth block. The motion information may include reference direction information (e.g., list 0, list 1, or both list 0 and list 1), an index for identifying a reference picture in a reference list, a motion vector, etc.

The inter-view predictor 14 may detect a reference block by using the time direction motion information set to the current depth block. In addition, the inter-view predictor 14 may set one of the time direction motion information candidates of the merge mode of the current depth block as the time direction motion information of the current depth block, and detect a block indicated by the set motion information of the current depth block, as the reference block of the current depth block.

For example, the inter-view predictor 14 may detect a first-view depth block indicated by the disparity vector on the basis of the location of the current second-view depth block, as the first-view depth block corresponding to the current depth block. In addition, the inter-view predictor 14 may obtain the time direction motion information from the first-view depth block and set the obtained time direction motion information as the time direction motion information of the current depth block. The inter-view predictor 14 may detect a second-view reference depth block based on the set time direction motion information of the current block, obtain a prediction block by using the reference depth block, and compare the prediction block to the current depth block to obtain residual data.

As another example of inter-view prediction, the inter-view predictor 14 may obtain disparity information of the first-view depth block from the first-view depth block.

For example, if the first-view depth block is reconstructed by performing inter-view prediction on a third-view depth block, the inter-view predictor 14 may obtain disparity information indicating the third-view depth block, from the first-view depth block.

In addition, the inter-view predictor 14 may set the obtained disparity information as disparity information of the current depth block, generate a prediction image based on a reference block indicated by the set disparity information, and compare a sample value of the generated prediction image to that of the current depth block to generate residual data.

As another example of inter-view prediction, the inter-view predictor 14 may perform disparity prediction on the current depth block. Disparity prediction refers to an operation for performing prediction by using a corresponding depth block indicated by a disparity vector of the current depth block, as a prediction image. The inter-view predictor 14 may predict the corresponding depth block of the current depth block to generate residual data, and the inter-view video encoding apparatus 10 may code and transmit the generated residual data.

For example, the inter-view predictor 14 may detect a first-view depth block indicated by the disparity vector on the basis of the location of the current depth block within the depth map, and obtain a prediction block of the current second-view depth block by using the detected first-view depth block. The inter-view predictor 14 may compare a sample value of the obtained prediction block to the sample value of the current depth block to obtain residual data.

The inter-view video encoding apparatus 10 according to various embodiments may include a central processor (not shown) for providing overall control to the disparity vector determiner 12 and the inter-view predictor 14. Alternatively, the disparity vector determiner 12 and the inter-view predictor 14 may be controlled by individual processors (not shown) and the processors may operate in association with each other to control the inter-view video encoding apparatus 10. Otherwise, the disparity vector determiner 12 and the inter-view predictor 14 may be controlled by an external processor (not shown) of the inter-view video encoding apparatus 10.

The inter-view video encoding apparatus 10 may include one or more data storages (not shown) for storing input and output data of the disparity vector determiner 12 and the inter-view predictor 14. The inter-view video encoding apparatus 10 may include a memory controller (not shown) for managing data input and output to and from the data storages.

In order to perform a video encoding operation including transformation and to output a result of the video encoding operation, the inter-view video encoding apparatus 10 may operate in association with an internal or external video encoding processor. The internal video encoding processor of the inter-view video encoding apparatus 10 according to an embodiment may be an independent processor for performing a video encoding operation. Also, the inter-view video encoding apparatus 10, a central processing unit, or a graphic processing unit may include a video encoding processor module to perform a basic video encoding operation.

Figure 2A:
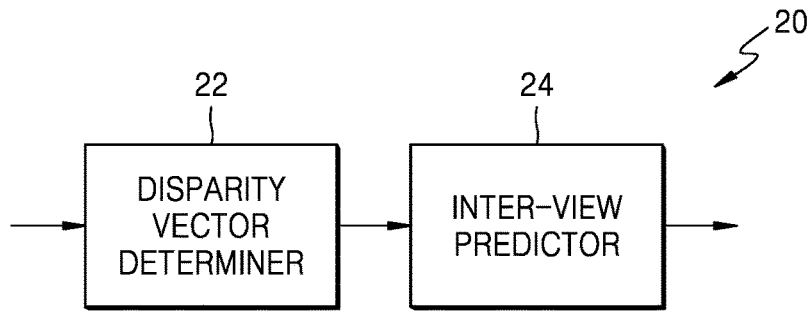
FIG. 2A is a block diagram of an inter-view video decoding apparatus according to various embodiments.

FIG. 2A is a block diagram of an inter-view video decoding apparatus 20 according to various embodiments.

The inter-view video decoding apparatus 20 according to various embodiments may include a disparity vector determiner 22 and an inter-view predictor 24.

The inter-view video decoding apparatus 20 according to various embodiments may receive bitstreams based on views. The number of views of the bitstreams received by the inter-view video decoding apparatus 20 is not limited to a certain number. However, for convenience of explanation, the following description assumes that the inter-view video decoding apparatus 20 receives and decodes a first-view stream and receives and decodes a second-view stream.

For example, center-view images may be reconstructed by decoding a first-view stream. Left-view images may be reconstructed by decoding a second-view stream in addition to the first-view stream. Right-view images may be reconstructed by decoding a third-view stream in addition to the first-view stream.

The inter-view video decoding apparatus 20 may obtain encoded data of the first-view images and the second-view images from the first-view stream and the second-view stream, respectively, and further obtain motion vectors generated due to inter prediction and prediction information generated due to inter-view prediction.

For example, the inter-view video decoding apparatus 20 may decode data inter-predicted per view, and decode data inter-view-predicted among multiple views. The inter-view video decoding apparatus 20 may also reconstruct data by performing motion compensation and inter-view decoding based on coding units or prediction units.

Images of each view stream may be reconstructed by performing motion compensation on a current image with reference to reconstruction images predicted due to inter prediction within the same view. Motion compensation refers to an operation for reconfiguring a reconstruction image of a current image by combining a reference image determined by using a motion vector of the current image, and a residual component of the current image.

In addition, the inter-view video decoding apparatus 20 may perform inter-view decoding with reference to the prediction information of the first-view images to decode the second-view images predicted due to inter-view prediction. Inter-view decoding includes an operation for reconfiguring prediction information of a current image by using prediction information of a reference block of another view to determine the prediction information of the current image.

The inter-view video decoding apparatus 20 according to an embodiment may perform inter-view decoding to reconstruct third-view images predicted with reference to the second-view images.

However, a second-view decoder according to various embodiments may decode the second-view stream without reference to the first-view video sequence. Accordingly, it should not be construed that second-view decoder always performs inter-view prediction to decode the second-view video sequence.

The inter-view video decoding apparatus 20 decodes each image of a video per block. The block may be a largest coding unit, a coding unit, a prediction unit, a transformation unit, or the like among coding units having a tree structure.

The inter-view video decoding apparatus 20 may decode the first-view images using parsed encoded symbols of the first-view images. If streams encoded based on coding units having a tree structure are received, the inter-view video decoding apparatus 20 may decode each largest coding unit of the first-view stream based on coding units having a tree structure.

The inter-view video decoding apparatus 20 may obtain coding information and encoded data by performing entropy decoding on each largest coding unit. The inter-view video decoding apparatus 20 may reconstruct residual components by performing inverse quantization and inverse transformation on the encoded data obtained from the stream. The inter-view video decoding apparatus 20 according to another embodiment may directly receive a bitstream of quantized transformation coefficients. As a result of performing inverse quantization and inverse transformation on the quantized transformation coefficients, the residual components of the images may be reconstructed.

The inter-view video decoding apparatus 20 may reconstruct the first-view images by combining prediction images and the residual components through motion compensation among images of the same view.

Based on an inter-view prediction structure, the inter-view video decoding apparatus 20 may generate second-view prediction images by using samples of first-view reconstruction images. The inter-view video decoding apparatus 20 may obtain prediction errors due to inter-view prediction, by decoding the second-view stream. The inter-view video decoding apparatus 20 may generate second-view reconstruction images by combining the second-view prediction images and the prediction errors.

The inter-view video decoding apparatus 20 may determine the second-view prediction images by using the decoded first-view reconstruction images. The inter-view video decoding apparatus 20 may perform inter prediction on the second-view image per block, e.g., a coding unit or a prediction unit, based on an inter-view prediction structure. That is, a block of the first-view image to be referred by a block of the second-view image may be determined. For example, a reconstruction block of the first-view image provided at a location corresponding to the location of a current block of the second-view image may be determined. The inter-view video decoding apparatus 20 may obtain a second-view prediction block by using the first-view reconstruction block corresponding to the second-view block. The inter-view video decoding apparatus 20 may reconstruct the second-view block by combining a sample value of the prediction block and a residual component generated due to inter-view prediction.

The inter-view video decoding apparatus 20 according to various embodiments may decode a second-view depth image. In this case, the inter-view video decoding apparatus 20 may use the first-view reconstruction image to decode the second-view depth image.

The inter-view video decoding apparatus 20 may determine a disparity vector to obtain a prediction block of the current second-view depth block. For example, the inter-view video decoding apparatus 20 may determine the disparity vector by using one of values of a sample value range of the current depth block. The inter-view video decoding apparatus 20 may remove dependency on peripheral blocks of the current depth block, by determining the disparity vector not by using sample values of the peripheral blocks but by using one of values of the sample value range of the current depth block. As a result, the inter-view video decoding apparatus 20 may improve inter-view video decoding efficiency by performing an operation for determining the disparity vector of the current depth block together with an operation for determining disparity vectors of the peripheral depth blocks. In addition, since the disparity vector uses a camera parameter of a picture unit or a slice unit, only one disparity calculation operation may be performed on a current picture or a current slice and a result thereof may be equally applied to all depth blocks. As such, inter-view video decoding efficiency may be improved.

The inter-view video decoding apparatus 20 may obtain a prediction block by using a first-view reconstruct block determined based on the disparity vector. A second-view block may be reconstructed by combining a sample value of the prediction block and a residual component generated due to inter-view prediction.

Figure 2B:
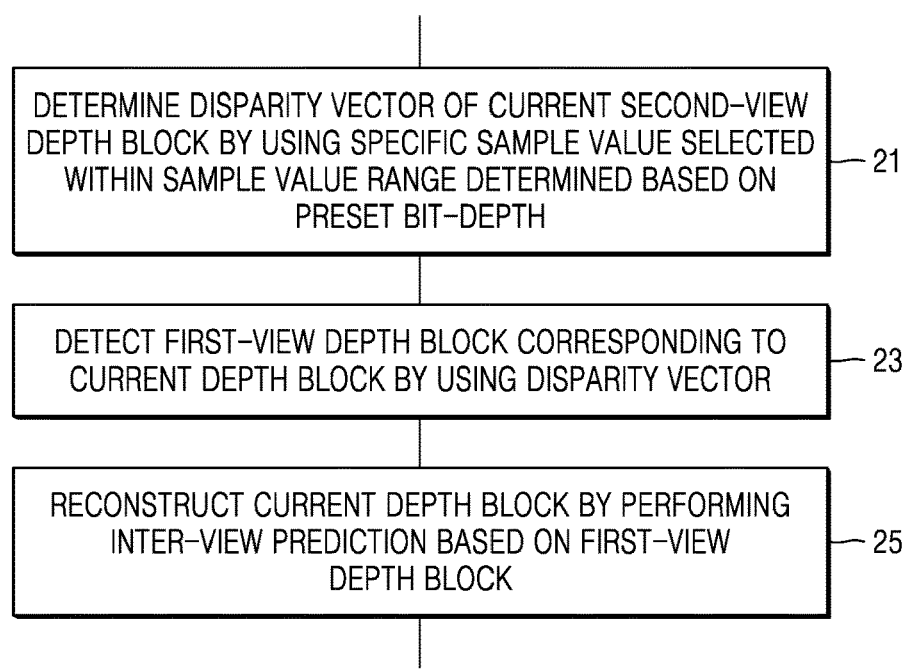
FIG. 2B is a flowchart of an inter-view video decoding method according to various embodiments.

A detailed description is now given of operation of the inter-view video decoding apparatus 20 with reference to FIG. 2B.

FIG. 2B is a flowchart of an inter-view video decoding method according to various embodiments.

The inter-view video decoding apparatus 20 according to an embodiment may decode a current second-view depth block. In this case, the inter-view video decoding apparatus 20 may perform inter-view prediction to decode the current second-view depth block. The inter-view video decoding apparatus 20 may determine a disparity vector of the current depth block to perform inter-view prediction.

In operation 21, the disparity vector determiner 22 according to an embodiment may select a specific sample value within a sample value range determined based on a preset bit-depth, and determine a disparity vector of a current depth block by using the selected specific sample value.

The disparity vector determiner 22 may obtain the bit-depth which is preset for the current depth block. For example, the disparity vector determiner 22 may obtain the bit-depth which is preset in view units, slice units, or picture units, but is not limited thereto.

The disparity vector determiner 22 may determine the sample value range of the current depth block based on the preset bit-depth. For example, if the bit-depth is set to 8 bits, the disparity vector determiner 22 may determine the sample value range of the current depth block to 0 to 255. Otherwise, if the bit-depth is set to 4 bits, the disparity vector determiner 22 may determine the sample value range of the current depth block to 0 to 15. The bit-depth is not limited to the above-mentioned examples and may be set to various numbers of bits. The disparity vector determiner 22 may variously determine the sample value range of the current depth block based on the preset bit-depth.

The disparity vector determiner 22 may determine a representative sample value within the sample value range of the current depth block. For example, the disparity vector determiner 22 may determine a median value among values included in the sample value range of the current depth block, as the representative sample value. For example, if the disparity vector determiner 22 determines the sample value range of the current depth block to 0 to 255, the disparity vector determiner 22 may determine a median value among 0 to 255, i.e., 128, as the representative sample value.

The disparity vector determiner 22 may determine the disparity vector of the current depth block based on the selected representative sample value. For example, the disparity vector determiner 22 may determine the disparity vector by applying a scale factor and an offset value to the selected representative sample value.

$$A=(S*V+O)>>N \qquad \text{Equation 1}$$

According to an embodiment, the disparity vector determiner 22 may determine a horizontal component Dx of the disparity vector by using Equation 1. In this case, A denotes the horizontal component Dx of the disparity vector, S denotes the scale factor, O denotes the offset value, and N denotes a shift parameter. The scale factor and the offset value may be determined based on a camera parameter, and the shift parameter may be set based on accuracy (e.g., sub-pixel accuracy) of the preset disparity vector. The value of a vertical component Dy of the disparity vector may be determined to 0.

According to another embodiment, the disparity vector determiner 22 may determine the vertical component Dy of the disparity vector by using Equation 1. In this case, A may indicate the vertical component Dy of the disparity vector, and the value of the horizontal component Dx of the disparity vector may be determined to 0. The disparity vector determiner 22 may determine whether A denotes the horizontal component Dx of the disparity vector, in various manners. For example, the disparity vector determiner 22 may determine whether A denotes the horizontal component Dx of the disparity vector, based on information acquired from the camera parameter.

According to another embodiment, the disparity vector determiner 22 may preset the disparity vector to (0,0). The disparity vector determiner 22 may improve inter-view video decoding efficiency by presetting the disparity vector to (0,0). However, (0,0) mentioned above is merely an example and the disparity vector determiner 22 may preset the disparity vector to a variety of values.

In addition, the disparity vector determiner 22 may induce the disparity vector in view units, slice units, or picture units by using the camera parameter and the bit-depth set in view units, slice units, or picture units. The disparity vector determiner 22 may improve inter-layer video decoding efficiency by inducing the disparity vector in units larger than depth block units.

In operation 23, the inter-view predictor 24 according to an embodiment may detect a first-view depth block corresponding to the current depth block by using the disparity vector.

The inter-view predictor 24 may detect the first-view depth block corresponding to the current depth block in a depth map of a first-view image corresponding to a current depth map, by using the disparity vector and the location of the current depth block.

For example, the inter-view predictor 24 may determine a first-view depth location pixel indicated by the disparity vector on the basis of a center pixel of the current block, and detect a block including the first-view depth location pixel, as the first-view depth block corresponding to the current block.

The inter-view predictor 24 may obtain the center pixel of the current block in various manners. For example, the inter-view predictor 24 may determine the location of the center pixel of the current block by using a top-left pixel location (Bx, By) of the current depth block, a width W of the current depth block, and a height H of the current depth block on the basis of the depth map. For example, the inter-view predictor 24 may determine a location (X,Y) of the center pixel of the current block to (Bx+(W>>1), By+(H>>1)).

In addition, the inter-view predictor 24 may obtain the first-view depth location pixel indicated by the disparity vector on the basis of the center pixel of the current block.

$$(M,N)=(X+((Dx+2)>>2),Y+((Dy+2)>>2)) \qquad \text{Equation 2}$$

For example, if accuracy of the disparity vector is quarter-pel (¼-pixel) accuracy, the inter-view predictor 24 may determine a first-view depth location pixel (M,N) by applying the location (X,Y) of the center pixel and the disparity vector (Dx, Dy) to Equation 2. Furthermore, if the determined first-view depth location pixel (M,N) indicates a pixel outside a boundary of the current depth map, the inter-view predictor 24 may perform a clipping operation.

The inter-view predictor 24 may detect a block including the determined first-view depth location pixel (M,N), as the first-view depth block corresponding to the current block.

In addition, the inter-view predictor 24 may add a preset value to the disparity vector to obtain a new disparity vector. The inter-view predictor 24 may detect the first-view depth block corresponding to the current depth block by using the new disparity vector.

For example, the inter-view predictor 24 may detect the first-view depth block corresponding to the current depth block by applying the new disparity vector to the above-described method.

The preset value may be set based on encoder, profile, decoder, or video codec standards. However, the preset value is not limited thereto and may be set in various manners.

In operation 25, the inter-view predictor 24 according to an embodiment may perform inter-view prediction on the depth block of the second-view image by using the detected first-view depth block.

The inter-view predictor 24 may obtain coding information of the first-view depth block from the detected first-view depth block. The coding information of the first-view depth block may include information used to perform inter prediction on the first-view depth block. For example, the coding information may include a time direction motion vector of the first-view depth block, disparity vector information of the first-view depth block, a reference picture index of the first-view depth block, or reference direction information of the first-view depth block, or any combination thereof.

As an example of inter-view prediction, the inter-view predictor 24 may obtain time direction motion information from the first-view depth block and set the obtained time direction motion information as time direction motion information of the current depth block or as time direction motion information candidates of a merge mode of the current depth block. The motion information may include reference direction information (e.g., list 0, list 1, or both list 0 and list 1), an index for identifying a reference picture in a reference list, a motion vector, etc.

The inter-view predictor 24 may detect a reference block by using the time direction motion information set to the current depth block. In addition, the inter-view predictor 24 may set one of the time direction motion information candidates of the merge mode of the current depth block as the time direction motion information of the current depth block, and detect a block indicated by the set motion information of the current depth block, as the reference block of the current depth block.

For example, the inter-view predictor 24 may detect a first-view depth block indicated by the disparity vector on the basis of the location of the current second-view depth block, as the first-view depth block corresponding to the current depth block. In addition, the inter-view predictor 24 may obtain the time direction motion information from the first-view depth block and set the obtained time direction motion information as the time direction motion information of the current depth block.

The inter-view predictor 24 may detect a second-view reference depth block based on the set time direction motion information of the current block, obtain a prediction block by using the reference depth block, and reconstruct the current depth block by combining a sample value of the prediction block and residual data obtained from a bitstream.

As another example of inter-view prediction, the inter-view predictor 24 may obtain disparity information of the first-view depth block from the first-view depth block.

For example, if the first-view depth block is reconstructed by performing inter-view prediction on a third-view depth block, the inter-view predictor 24 may obtain disparity information indicating the third-view depth block, from the first-view depth block.

In addition, the inter-view predictor 24 may set the obtained disparity information as disparity information of the current depth block, generate a prediction image based on a reference block indicated by the set disparity information, and compare a sample value of the generated prediction image to that of the current depth block to generate residual data.

As another example of inter-view prediction, the inter-view predictor 24 may perform disparity compensation.

For example, the inter-view predictor 24 may detect a first-view depth block indicated by the disparity vector on the basis of the location of the current depth block within the depth map, and obtain a prediction block of the current second-view depth block by using the detected first-view depth block as the reference block. The inter-view predictor 24 may reconstruct the current second-view block by combining a sample value of the obtained prediction block and residual data obtained from a bitstream.

The inter-view video decoding apparatus 20 according to various embodiments may include a central processor (not shown) for providing overall control to the disparity vector determiner 22 and the inter-view predictor 24. Alternatively, the disparity vector determiner 22 and the inter-view predictor 24 may be controlled by individual processors (not shown) and the processors may operate in association with each other to control the inter-view video decoding apparatus 20. Otherwise, the disparity vector determiner 22 and the inter-view predictor 24 may be controlled by an external processor (not shown) of the inter-view video decoding apparatus 20 according to various embodiments.

The inter-view video decoding apparatus 20 according to various embodiments may include one or more data storages (not shown) for storing input and output data of the disparity vector determiner 22 and the inter-view predictor 24. The inter-view video decoding apparatus 20 may include a memory controller (not shown) for managing data input and output to and from the data storages.

In order to reconstruct a video by performing a video decoding operation including inverse transformation, the inter-view video decoding apparatus 20 according to various embodiments may operate in association with an internal or external video decoding processor. The internal video decoding processor of the inter-view video decoding apparatus 20 according to various embodiments may be an independent processor. Alternatively, the inter-view video decoding apparatus 20, a central processing unit, or a graphic processing unit may include a video decoding processor module to perform a basic video decoding operation.

Figure 3:
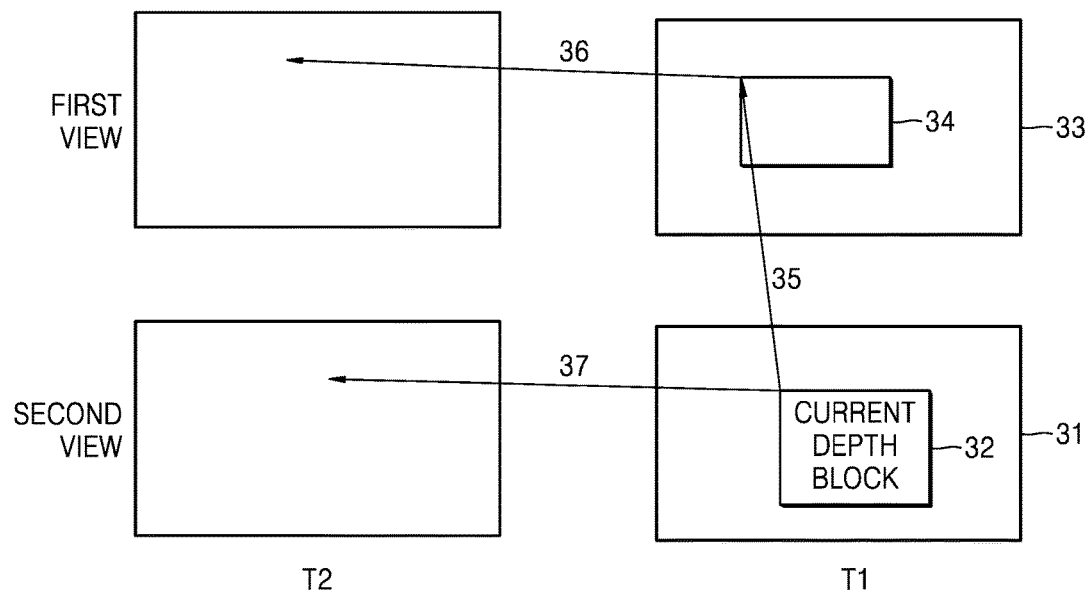
FIG. 3 is a diagram for describing a method of performing inter-view compensation on a current depth block based on a disparity vector by the inter-view video decoding apparatus, according to various embodiments.

FIG. 3 is a diagram for describing a method of performing inter-view prediction on a current depth block based on a disparity vector by the inter-view video decoding apparatus 20, according to various embodiments.

The inter-view video decoding apparatus 20 may select a specific sample value within a sample value range determined based on a preset bit-depth, and determine the disparity vector of the current depth block by using the selected specific sample value.

The inter-view video decoding apparatus 20 may obtain the bit-depth which is preset for the current depth block. For example, the inter-view video decoding apparatus 20 may obtain the bit-depth which is preset in view units, slice units, or picture units.

The inter-view video decoding apparatus 20 may determine the sample value range of the current depth block based on the preset bit-depth. For example, if the bit-depth is set to 8 bits, the disparity vector determiner 22 may determine the sample value range of the current depth block to 0 to 255.

The inter-view video decoding apparatus 20 may determine a representative sample value within the sample value range of the current depth block. For example, the inter-view video decoding apparatus 20 may determine a median value among values included in the sample value range of the current depth block, as the representative sample value. For example, if the inter-view video decoding apparatus 20 determines the sample value range of the current depth block to 0 to 255, the inter-view video decoding apparatus 20 may determine a median value among 0 to 255, i.e., 128, as the representative sample value.

The inter-view video decoding apparatus 20 may determine the disparity vector of the current depth block based on the selected representative sample value. For example, the disparity vector determiner 22 may determine the disparity vector by applying a scale factor and an offset value to the selected representative sample value.

Referring to FIG. 3, the inter-view video decoding apparatus 20 may detect a first-view depth block 34 corresponding to a current depth block 32 in a first-view depth map 33 corresponding to a current second-view depth map 31, by using a disparity vector 35 and the location of the current depth block 32.

The inter-view video decoding apparatus 20 may obtain motion information from the detected first-view depth block 34 and set the obtained motion information as motion information of the current depth block. For example, referring to FIG. 3, the inter-view video decoding apparatus 20 may obtain a motion vector 36 of the first-view depth block 34 and set the obtained motion vector 36 as a motion vector 37 of the current depth block 32.

The motion vector 36 illustrated in FIG. 3 is merely an example of the motion information, and the motion information is not limited to a motion vector. For example, the motion information may include a reference picture index, reference direction information, a motion vector, or any combination thereof, but is not limited thereto.

The inter-view video decoding apparatus 20 may detect a reference depth block by using the time direction motion vector 37 of the current depth block 32, and obtain a prediction block by using the reference depth block. In addition, the inter-view video decoding apparatus 20 may reconstruct the current second-view depth block by combining the prediction block and residual data obtained from a bitstream.

Figure 4:
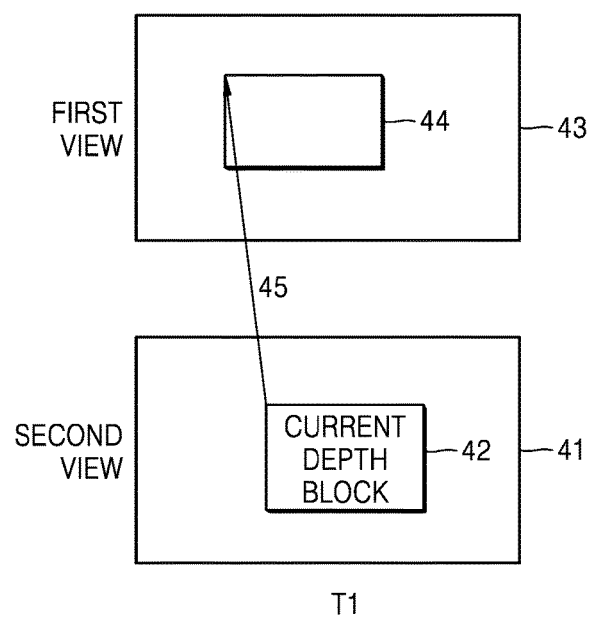
FIG. 4 is a diagram for describing a method of performing inter-view compensation on a current depth block by the inter-view video decoding apparatus, according to other embodiments.

FIG. 4 is a diagram for describing a method of performing inter-view prediction on a current depth block by the inter-view video decoding apparatus 20, according to other embodiments.

The inter-view video decoding apparatus 20 may select a specific sample value within a sample value range determined based on a preset bit-depth, and determine a disparity vector of the current depth block by using the selected specific sample value.

The inter-view video decoding apparatus 20 may obtain the bit-depth which is preset for the current depth block. For example, the inter-view video decoding apparatus 20 may obtain the bit-depth which is preset in view units, slice units, or picture units.

The inter-view video decoding apparatus 20 may determine the sample value range of the current depth block based on the preset bit-depth. For example, if the bit-depth is set to 8 bits, the disparity vector determiner 22 may determine the sample value range of the current depth block to 0 to 255.

The inter-view video decoding apparatus 20 may determine a representative sample value within the sample value range of the current depth block. For example, the inter-view video decoding apparatus 20 may determine a median value among values included in the sample value range of the current depth block, as the representative sample value. For example, if the inter-view video decoding apparatus 20 determines the sample value range of the current depth block to 0 to 255, the inter-view video decoding apparatus 20 may determine a median value among 0 to 255, i.e., 128, as the representative sample value.

The inter-view video decoding apparatus 20 may determine the disparity vector of the current depth block based on the selected representative sample value. For example, the disparity vector determiner 22 may determine the disparity vector by applying a scale factor and an offset value to the selected representative sample value.

Referring to FIG. 4, the inter-view video decoding apparatus 20 may perform disparity compensation on the current depth block by using the determined disparity vector.

For example, the inter-view video decoding apparatus 20 may detect a first-view depth block 44 corresponding to a current depth block 42 in a first-view depth map 43 corresponding to a current depth map 41, by using a disparity vector 45 and the location of the current depth block 42.

The inter-view video decoding apparatus 20 may obtain a prediction block by using the detected first-view depth block 44. In addition, the inter-view video decoding apparatus 20 may reconstruct the current second-view depth block by combining the prediction block and residual data obtained from a bitstream.

FIG. 5 is a diagram for describing a method of inducing a disparity vector by using a preset bit-depth, according to various embodiments.

Referring to FIG. 5, the inter-view video decoding apparatus 20 may use a preset bit-depth BitDepthY to induce a disparity vector MvDisp[x][y] or MvRefinedDisp[x][y] 51 of a current depth block.

For example, the inter-view video decoding apparatus 20 may use "1<<(BitDepthY−1)" 52 to induce the disparity vector MvDisp[x][y] or MvRefinedDisp[x][y] 51 of the current depth block. "1<<(BitDepthY−1)" 52 refers to a median value among values included in a sample value range of the current depth block, which is determined based on the preset bit-depth BitDepthY.

For example, if the bit-depth BitDepthY is set to 8 bits, the inter-view video decoding apparatus 20 may induce the disparity vector by using the median value among the values included in the sample value range of the current depth block, i.e., "{1<<(8-1)}=128".

FIG. 6 is a diagram for describing a method of determining a disparity vector by using a preset value, according to various embodiments.

Referring to FIG. 6, the inter-view video decoding apparatus 20 may preset a disparity vector MvRefinedDisp[x][y] 62 of a current depth block.

For example, the inter-view video decoding apparatus 20 may preset the disparity vector MvRefinedDisp[x][y] 62 of the current depth block to (0,0) 61.

(0,0) illustrated in FIG. 6 is merely an example. The inter-view video decoding apparatus 20 is not limited thereto and may preset the disparity vector by using a variety of values.

Although the operations described above in relation to FIGS. 3 to 6 are performed by the inter-view video decoding apparatus 20, it will be easily understood by one of ordinary skill in the art that the above operations may be equally performed by the inter-view video encoding apparatus 10.

As described above, the inter-view video encoding apparatus 10 and the inter-view video decoding apparatus 20 according to embodiments split blocks of divided video data into coding units of a tree structure, and encoding units, prediction units, and transformation units are used for inter-view prediction or inter-prediction with respect to the coding units. Hereinafter, with reference to FIGS. 7 through 19, a video encoding method and apparatus therefor, and a video decoding method and apparatus therefor based on coding units of a tree structure and transformation units according to embodiments are described.

Basically, in an encoding/decoding procedure for a multiview video, an encoding/decoding procedure for first view images, and an encoding/decoding procedure for second view images are separately performed. That is, when inter-view prediction occurs in the multiview video, encoding/decoding results with respect to a single view video may be mutually referred to, but an encoding/decoding procedure is performed for each of single view videos.

Therefore, for convenience of description, a video encoding procedure and a video decoding procedure based on coding units of a tree structure that are described later with reference to FIGS. 7 through 19 are a video encoding procedure and a video decoding procedure for a single view video, thus, inter-prediction and motion compensation are described in detail. However, as described above with reference to FIGS. 1A through 6, for encoding/decoding a video stream, inter-view prediction and compensation between first view images and second view images are performed.

Figure 7:
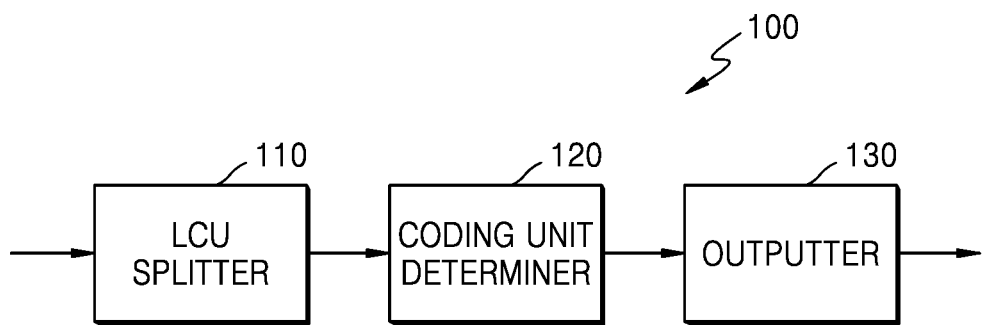
FIG. 7 illustrates a block diagram of a video encoding apparatus based on coding units of a tree structure 100, according to various embodiments.

Therefore, in order for the encoder of the inter-view video encoding apparatus 10 according to an embodiment to encode a multiview video, based on coding units of a tree structure, the inter-view video encoding apparatus 10 may include video encoding apparatuses 100 of FIG. 7 corresponding to the number of views of the multiview video so as to perform video encoding on each of single view videos, and may control the video encoding apparatuses 800 to encode the single view videos, respectively. Accordingly, the encoder of the inter-view video encoding apparatus 10 may generate a video stream including an encoding result of each view.

Figure 8:
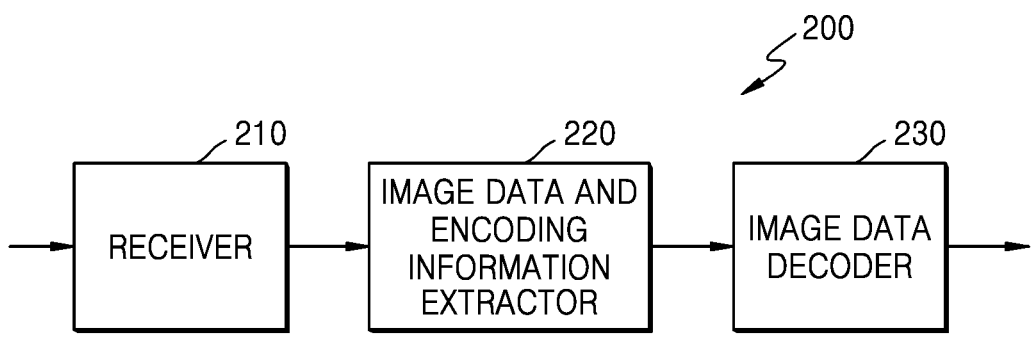
FIG. 8 illustrates a block diagram of a video decoding apparatus based on coding units of a tree structure 200, according to various embodiments.

Similarly, in order for the decoder of the inter-view video decoding apparatus 20 to decode a multiview video, based on coding units of a tree structure, the inter-view video decoding apparatus 20 may include video decoding apparatuses 200 of FIG. 8 corresponding to the number of views of a multiview video so as to perform video decoding on each of views of a received first view videostream and a received second view videostream, and may control the video decoding apparatuses 200 to decode single view videos, respectively. Then, the inter-view video decoding apparatus 20 may perform inter-view compensation by using decoding results with respect to discrete single views obtained by the video decoding apparatuses 200. Accordingly, the decoder of the inter-view video decoding apparatus 20 may generate first view images and second view images that are reconstructed for each of the views.

FIG. 7 illustrates a block diagram of a video encoding apparatus based on coding units of a tree structure 100, according to various embodiments.

The video encoding apparatus involving video prediction based on coding units of the tree structure 100 includes a coding unit determiner 120 and an output unit 130. Hereinafter, for convenience of description, the video encoding apparatus involving video prediction based on coding units of the tree structure 100 is referred to as the 'video encoding apparatus 100'.

The coding unit determiner 120 may split a current picture based on a largest coding unit that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit may be defined as an uppermost depth and a depth of the smallest coding unit may be defined as a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 120 encodes at least one split region obtained by splitting a region of the largest coding unit according to depths, and determines a depth to output a final encoding result according to the at least one split region. That is, the coding unit determiner 120 determines a final depth by encoding the image data in the deeper coding units according to depths, according to the largest coding unit of the current picture, and selecting a depth having the least encoding error. The determined final depth and image data according to largest coding units are output to the output unit 130.

The image data in the largest coding unit is encoded based on the deeper coding units corresponding to at least one depth equal to or below the maximum depth, and results of encoding the image data based on each of the deeper coding units are compared. A depth having the least encoding error may be selected after comparing encoding errors of the deeper coding units. At least one final depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the final depths may differ according to regions in the image data. Thus, one or more final depths may be determined in one largest coding unit, and the image data of the largest coding unit may be divided according to coding units of at least one final depth.

Accordingly, the coding unit determiner 120 according to an embodiment may determine coding units having a tree structure included in a current largest coding unit. The 'coding units having a tree structure' according to an embodiment include coding units corresponding to a depth determined to be the final depth, from among all deeper coding units included in the current largest coding unit. A coding unit of a final depth may be hierarchically determined according to depths in the same region of the largest coding unit, and may be independently determined in different regions. Equally, a final depth in a current region may be independently determined from a final depth in another region.

A maximum depth according to an embodiment is an index related to the number of splitting times from a largest coding unit to a smallest coding unit. A first maximum depth according to an embodiment may denote the total number of splitting times from the largest coding unit to the smallest coding unit. A second maximum depth according to an embodiment may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the smallest coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. Hereinafter, for convenience of description, the prediction encoding and the transformation will be described based on a coding unit of a current depth in at least one largest coding unit.

The video encoding apparatus 100 according to an embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but may also select a data unit different from the coding unit so as to perform the prediction encoding on the image data in the coding unit.

In order to perform prediction encoding in the largest coding unit, the prediction encoding may be performed based on a coding unit of a final depth, i.e., based on the coding unit that is no longer split. Hereinafter, the coding unit that is no longer split and becomes a basis unit for prediction encoding will now be referred to as a 'prediction unit'. A partition obtained by splitting the prediction unit may include a prediction unit and a data unit obtained by splitting at least one selected from a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode may selectively include symmetrical partitions obtained by symmetrically splitting a height or width of the prediction unit, partitions obtained by asymmetrically splitting the height or width of the prediction unit, such as 1:n or n:1, partitions obtained by geometrically splitting the prediction unit, or partitions having arbitrary shapes.

A prediction mode of the prediction unit may be at least one of an intra mode, an inter mode, and a skip mode. For example, the intra mode and the inter mode may be performed on the partition of 2N×2N, 2N×N, N×2N, or N×N. Also, the skip mode may be performed only on the partition of 2N×2N. The encoding may be independently performed on one prediction unit in a coding unit, thereby selecting a prediction mode having a least encoding error.

The video encoding apparatus 100 according to an embodiment may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the transformation unit may include a data unit for an intra mode and a transformation unit for an inter mode.

The transformation unit in the coding unit may be recursively split into smaller sized regions in the similar manner as the coding unit according to the tree structure, thus, residual data of the coding unit may be divided according to the transformation unit having the tree structure according to a transformation depth.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, with respect to the transformation unit, the transformation unit having the tree structure may be set according to the transformation depths.

Split information according to depths requires not only information about a depth but also requires information related to prediction and transformation. Accordingly, the coding unit determiner 120 may determine not only a depth generating a least encoding error but may also determine a partition mode in which a prediction unit is split to partitions, a prediction mode according to prediction units, and a size of a transformation unit for transformation.

Coding units according to a tree structure in a largest coding unit and methods of determining a prediction unit/partition, and a transformation unit, according to embodiments, will be described in detail later with reference to FIGS. 9 through 19.

The coding unit determiner 120 may measure an encoding error of deeper coding units according to depths by using Rate-Distortion Optimization based on Lagrangian multipliers.

The output unit 130 outputs, in bitstreams, the image data of the largest coding unit, which is encoded based on the at least one depth determined by the coding unit determiner 120, and information according to depths.

The encoded image data may correspond to a result obtained by encoding residual data of an image.

The split information according to depths may include depth information, partition mode information of the prediction unit, prediction mode information, and the split information of the transformation unit.

Final depth information may be defined by using split information according to depths, which specifies whether encoding is performed on coding units of a lower depth instead of a current depth. If the current depth of the current coding unit is a depth, the current coding unit is encoded by using the coding unit of the current depth, and thus split information of the current depth may be defined not to split the current coding unit to a lower depth. On the contrary, if the current depth of the current coding unit is not the depth, the encoding has to be performed on the coding unit of the lower depth, and thus the split information of the current depth may be defined to split the current coding unit to the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and at least one piece of split information has to be determined for a coding unit of a depth, at least one piece of split information may be determined for one largest coding unit. Also, a depth of data of the largest coding unit may vary according to locations since the data is hierarchically split according to depths, and thus a depth and split information may be set for the data.

Accordingly, the output unit 130 according to an embodiment may assign encoding information about a corresponding depth and an encoding mode to at least one of the coding unit, the prediction unit, and a minimum unit included in the largest coding unit.

The minimum unit according to an embodiment is a square data unit obtained by splitting the smallest coding unit constituting the lowermost depth by 4. Alternatively, the minimum unit according to an embodiment may be a maximum square data unit that may be included in all of the coding units, prediction units, partition units, and transformation units included in the largest coding unit.

For example, the encoding information output by the output unit 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction during an inter mode, about a reference image index of the inter mode, about a motion vector, about a chroma component of an intra mode, and about an interpolation method during the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit allowed with respect to a current video, and information about a minimum size of the transformation unit may also be output through a header of a bitstream, a sequence parameter set, or a picture parameter set. The output unit 130 may encode and output reference information, prediction information, and slice type information, which are related to prediction.

According to the simplest embodiment for the video encoding apparatus 100, the deeper coding unit may be a coding unit obtained by dividing a height or width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 100 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimal encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus according to the embodiment, image compression efficiency may be increased since a coding unit is adjusted while considering characteristics of an image while increasing a maximum size of a coding unit while considering a size of the image.

FIG. 8 illustrates a block diagram of a video decoding apparatus based on coding units of a tree structure 200, according to various embodiments.

The video decoding apparatus involving video prediction based on coding units of the tree structure 200 according to the embodiment includes a receiver 210, an image data and encoding information extractor 220, and an image data decoder 230. Hereinafter, for convenience of description, the video decoding apparatus involving video prediction based on coding units of the tree structure 200 according to the embodiment is referred to as the 'video decoding apparatus 200'.

Definitions of various terms, such as a coding unit, a depth, a prediction unit, a transformation unit, and various types of split information for decoding operations by the video decoding apparatus 200 according to the embodiment are identical to those described with reference to FIG. 7 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each largest coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts, from the parsed bitstream, a final depth and split information about the coding units having a tree structure according to each largest coding unit. The extracted final depth and the extracted split information are output to the image data decoder 230. That is, the image data in a bit stream is split into the largest coding unit so that the image data decoder 230 may decode the image data for each largest coding unit.

A depth and split information according to each of the largest coding units may be set for one or more pieces of depth information, and split information according to depths may include partition mode information of a corresponding coding unit, prediction mode information, and split information of a transformation unit. Also, as the depth information, the split information according to depths may be extracted.

The depth and the split information according to each of the largest coding units extracted by the image data and encoding information extractor 220 are a depth and split information determined to generate a minimum encoding error when an encoder, such as the video encoding apparatus 100, repeatedly performs encoding for each deeper coding unit according to depths according to each largest coding unit. Accordingly, the video decoding apparatus 200 may reconstruct an image by decoding data according to an encoding method that generates the minimum encoding error.

Since encoding information about the depth and the encoding mode may be assigned to a predetermined data unit from among a corresponding coding unit, a prediction unit, and a minimum unit, the image data and encoding information extractor 220 may extract the depth and the split information according to the predetermined data units. If a depth and split information of a corresponding largest coding unit are recorded according to each of the predetermined data units, predetermined data units having the same depth and the split information may be inferred to be the data units included in the same largest coding unit.

The image data decoder 230 reconstructs the current picture by decoding the image data in each largest coding unit based on the depth and the split information according to each of the largest coding units. That is, the image data decoder 230 may decode the encoded image data, based on a read partition mode, a prediction mode, and a transformation unit for each coding unit from among the coding units having the tree structure included in each largest coding unit. A decoding process may include a prediction process including intra prediction and motion compensation, and an inverse transformation process.

The image data decoder 230 may perform intra prediction or motion compensation according to a partition and a prediction mode of each coding unit, based on the information about the partition type and the prediction mode of the prediction unit of the coding unit according to depths.

In addition, for inverse transformation for each largest coding unit, the image data decoder 230 may read information about a transformation unit according to a tree structure for each coding unit so as to perform inverse transformation based on transformation units for each coding unit. Due to the inverse transformation, a pixel value of a spatial domain of the coding unit may be reconstructed.

The image data decoder 230 may determine a depth of a current largest coding unit by using split information according to depths. If the split information specifies that image data is no longer split in the current depth, the current depth is a depth. Accordingly, the image data decoder 230 may decode the image data of the current largest coding unit by using the information about the partition mode of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

The inter-view video decoding apparatus 20 described above with reference to FIG. 2A may include the video decoding apparatuses 200 corresponding to the number of views, so as to reconstruct first view images and second view images by decoding a received first view imagestream and a received second view imagestream.

When the first view imagestream is received, the image data decoder 230 of the video decoding apparatus 200 may split samples of the first view images, which are extracted from the first view imagestream by an extractor 220, into coding units according to a tree structure of a largest coding unit. The image data decoder 230 may perform motion compensation, based on prediction units for the inter-image prediction, on each of the coding units according to the tree structure of the samples of the first view images, and may reconstruct the first view images.

When the second view imagestream is received, the image data decoder 230 of the video decoding apparatus 200 may split samples of the second view images, which are extracted from the second view imagestream by the extractor 220, into coding units according to a tree structure of a largest coding unit. The image data decoder 230 may perform motion compensation, based on prediction units for the inter-image prediction, on each of the coding units of the samples of the second view images, and may reconstruct the second view images.

Thus, the video decoding apparatus 200 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimal split information received from an encoding terminal.

Figure 9:
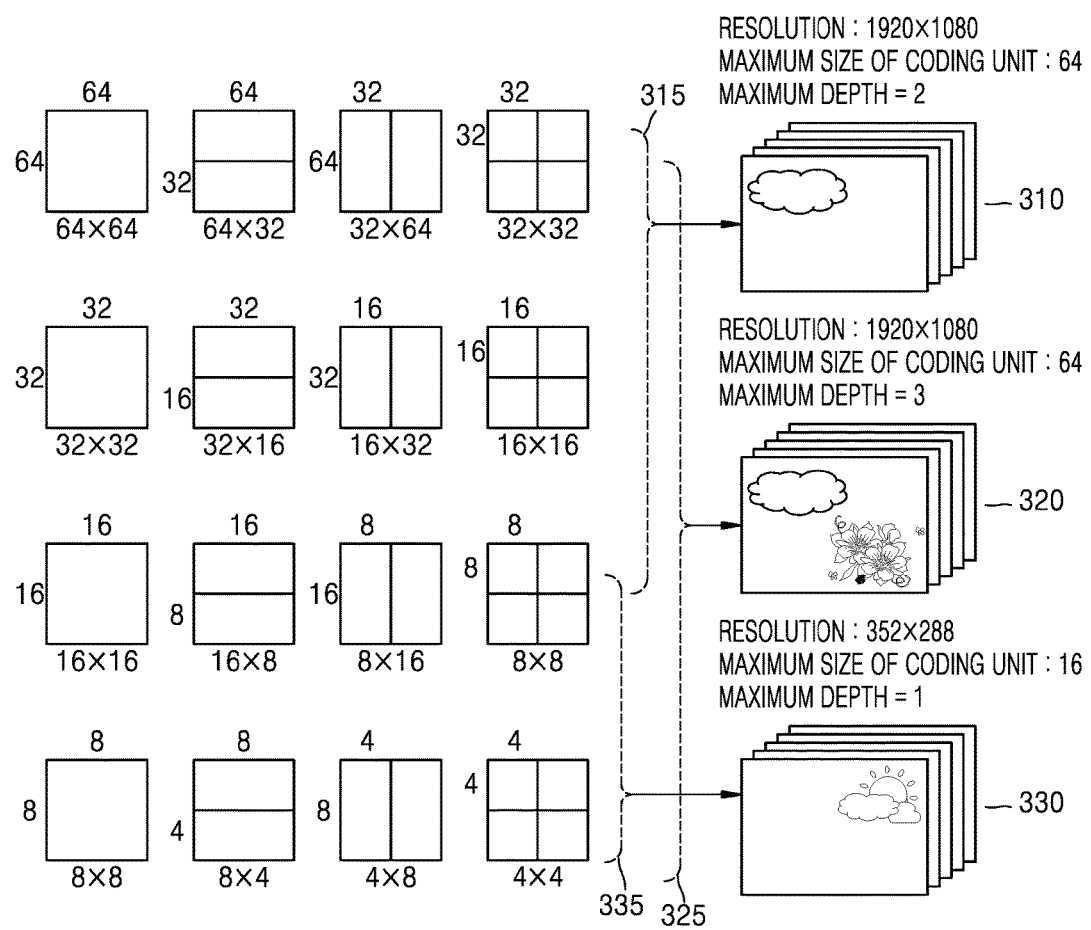
FIG. 9 illustrates a concept of coding units, according to various embodiments.

FIG. 9 illustrates a concept of coding units, according to various embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 9 denotes the total number of splits from a largest coding unit to a smallest coding unit.

If a resolution is high or a data amount is large, it is preferable that a maximum size of a coding unit is large so as to not only increase encoding efficiency but also to accurately reflect characteristics of an image. Accordingly, the maximum size of the coding unit of the video data 310 and 320 having a higher resolution than the video data 330 may be selected to 64.

Since the maximum depth of the video data 310 is 2, coding units 315 of the vide data 310 may include a largest coding unit having a long axis size of 64, and coding units having long axis sizes of 32 and 16 since depths are deepened to two layers by splitting the largest coding unit twice. On the other hand, since the maximum depth of the video data 330 is 1, coding units 335 of the video data 330 may include a largest coding unit having a long axis size of 16, and coding units having a long axis size of 8 since depths are deepened to one layer by splitting the largest coding unit once.

Since the maximum depth of the video data 320 is 3, coding units 325 of the video data 320 may include a largest coding unit having a long axis size of 64, and coding units having long axis sizes of 32, 16, and 8 since the depths are deepened to 3 layers by splitting the largest coding unit three times. As a depth deepens, an expression capability with respect to detailed information may be improved.

Figure 10:
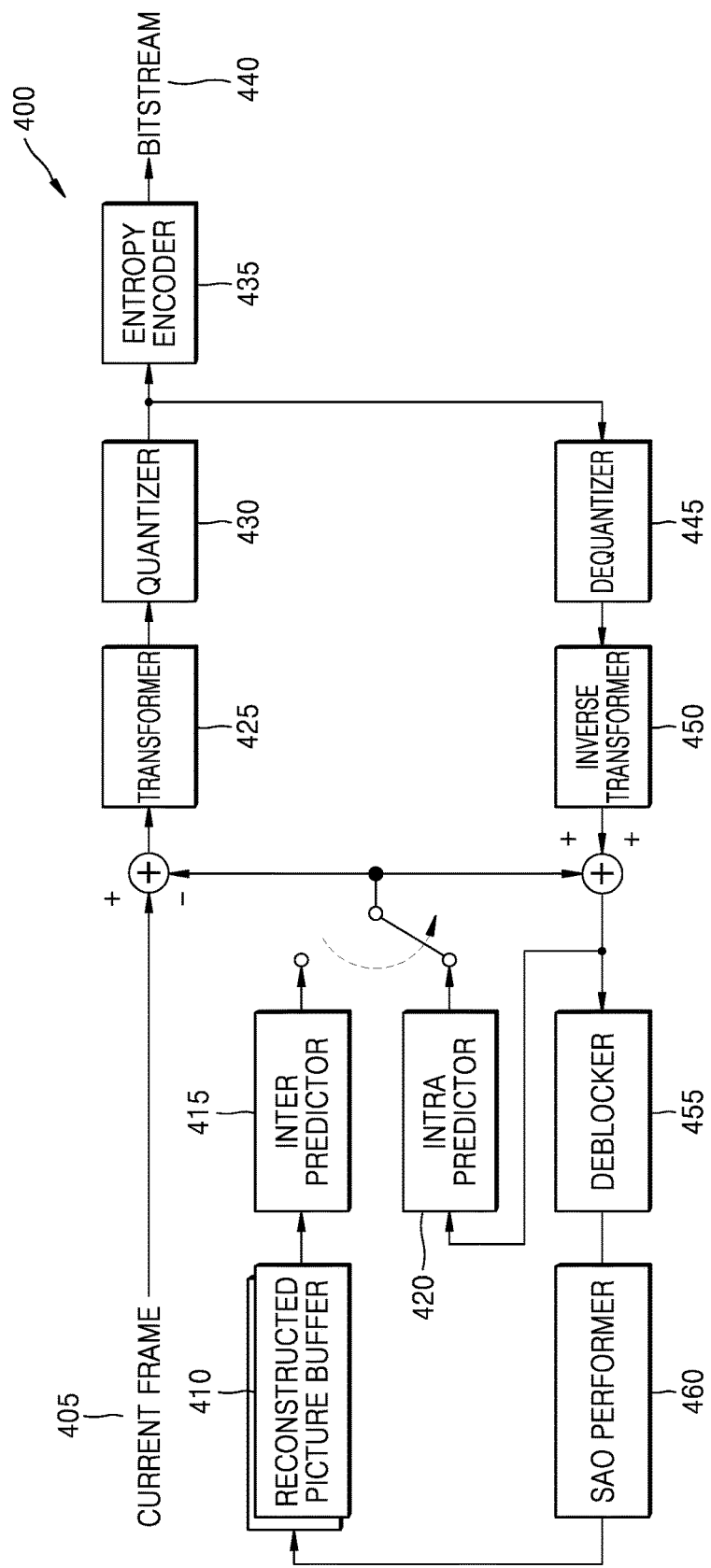
FIG. 10 illustrates a block diagram of an image encoder 400 based on coding units, according to various embodiments.

FIG. 10 illustrates a block diagram of an image encoder 400 based on coding units, according to various embodiments.

The image encoder 400 according to an embodiment performs operations of a picture encoder 120 of the video encoding apparatus 100 so as to encode image data. That is, an intra predictor 420 performs intra prediction on coding units in an intra mode, from among a current image 405, and an inter predictor 415 performs inter prediction on coding units in an inter mode by using the current image 405 and a reference image obtained from a reconstructed picture buffer 410 according to prediction units. The current image 405 may be split into largest coding units and then the largest coding units may be sequentially encoded. In this regard, the largest coding units that are to be split into coding units having a tree structure may be encoded.

Residue data is generated by subtracting prediction data regarding a coding unit of each mode which is output from the intra predictor 420 or the inter predictor 415 from data regarding an encoded coding unit of the current image 405, and the residue data is output as a quantized transformation coefficient according to transformation units through a transformer 425 and a quantizer 430. The quantized transformation coefficient is reconstructed as the residue data in a spatial domain through an inverse-quantizer 445 and an inverse-transformer 450. The reconstructed residual image data in the spatial domain is added to prediction data for the coding unit of each mode which is output from the intra predictor 420 or the inter predictor 415 and thus is reconstructed as data in a spatial domain for a coding unit of the current image 405. The reconstructed data in the spatial domain is generated as a reconstructed image through a de-blocking unit 455 and an SAO performer 460 and the reconstructed image is stored in the reconstructed picture buffer 410. The reconstructed images stored in the reconstructed picture buffer 410 may be used as reference images for inter predicting another image. The transformation coefficient quantized by the transformer 425 and the quantizer 430 may be output as a bitstream 440 through an entropy encoder 435.

In order for the image encoder 400 to be applied in the video encoding apparatus 100, all elements of the image encoder 400, i.e., the inter predictor 415, the intra predictor 420, the transformer 425, the quantizer 430, the entropy encoder 435, the inverse-quantizer 445, the inverse-transformer 450, the de-blocking unit 455, and the SAO performer 460, may perform operations based on each coding unit among coding units having a tree structure according to each largest coding unit.

In particular, the intra predictor 420 and the inter predictor 415 may determine a partition mode and a prediction mode of each coding unit from among the coding units having a tree structure, by taking into account the maximum size and the maximum depth of a current largest coding unit, and the transformer 425 may determine whether to split a transformation unit according to a quadtree in each coding unit from among the coding units having a tree structure.

Figure 11:
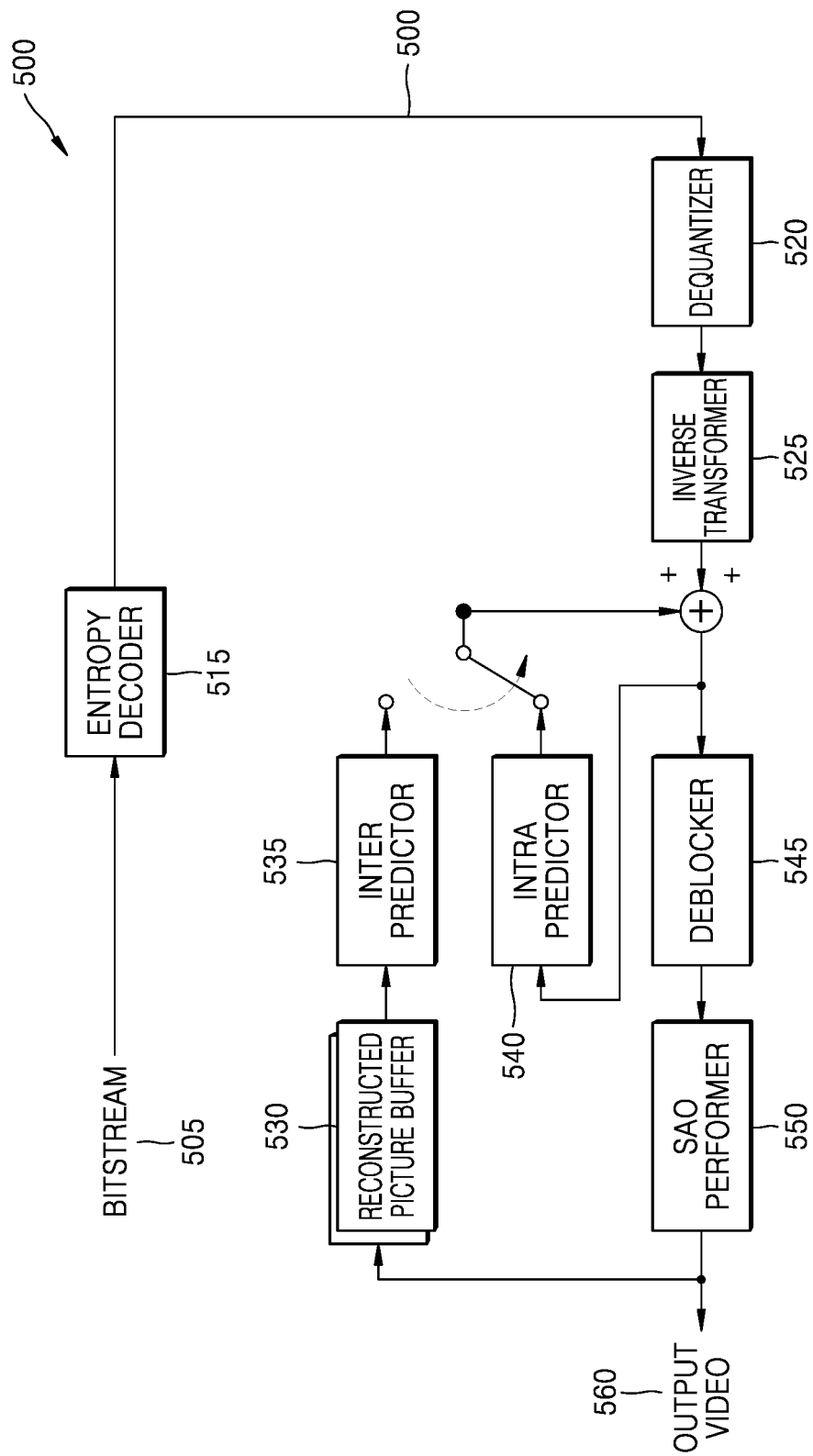
FIG. 11 illustrates a block diagram of an image decoder 500 based on coding units, according to various embodiments.

FIG. 11 illustrates a block diagram of an image decoder 500 based on coding units, according to various embodiments.

An entropy decoder 515 parses, from a bitstream 505, encoded image data to be decoded and encoding information required for decoding. The encoded image data corresponds to a quantized transformation coefficient, and an inverse-quantizer 520 and an inverse-transformer 525 reconstruct residue data from the quantized transformation coefficient.

An intra predictor 540 performs intra prediction on a coding unit in an intra mode according to prediction units. An inter predictor 535 performs inter prediction by using a reference image with respect to a coding unit in an inter mode from among a current image, wherein the reference image is obtained by a reconstructed picture buffer 530 according to prediction units.

Prediction data and residue data regarding coding units of each mode, which passed through the intra predictor 540 or the inter predictor 535, are summed, so that data in a spatial domain regarding coding units of the current image 405 may be reconstructed, and the reconstructed data in the spatial domain may be output as a reconstructed image 560 through a de-blocking unit 545 and an SAO performer 550. Reconstructed images stored in the reconstructed picture buffer 530 may be output as reference images.

In order for a picture decoder 230 of the video decoding apparatus 200 to decode the image data, operations after the entropy decoder 515 of the image decoder 500 according to an embodiment may be performed.

In order for the image decoder 500 to be applied in the video decoding apparatus 200 according to an embodiment, all elements of the image decoder 500, i.e., the entropy decoder 515, the inverse-quantizer 520, the inverse-transformer 525, the intra predictor 540, the inter predictor 535, the de-blocking unit 545, and the SAO performer 550 may perform operations based on coding units having a tree structure for each largest coding unit.

In particular, the intra predictor 540 and the inter predictor 535 may determine a partition mode and a prediction mode of each coding unit from among the coding units according to a tree structure, and the inverse-transformer 525 may determine whether or not to split a transformation unit according to a quadtree in each coding unit.

The encoding operation of FIG. 9 and the decoding operation of FIG. 10 are described as a videostream encoding operation and a videostream decoding operation, respectively, in a single view. Thus, if the encoder 10 of FIG. 1A encodes a videostream of two or more views, the image encoder 400 may be provided for each view. Similarly, if the decoder 20 of FIG. 2A decodes a videostream of two or more views, the video decoder 500 may be provided for each view.

Figure 12:
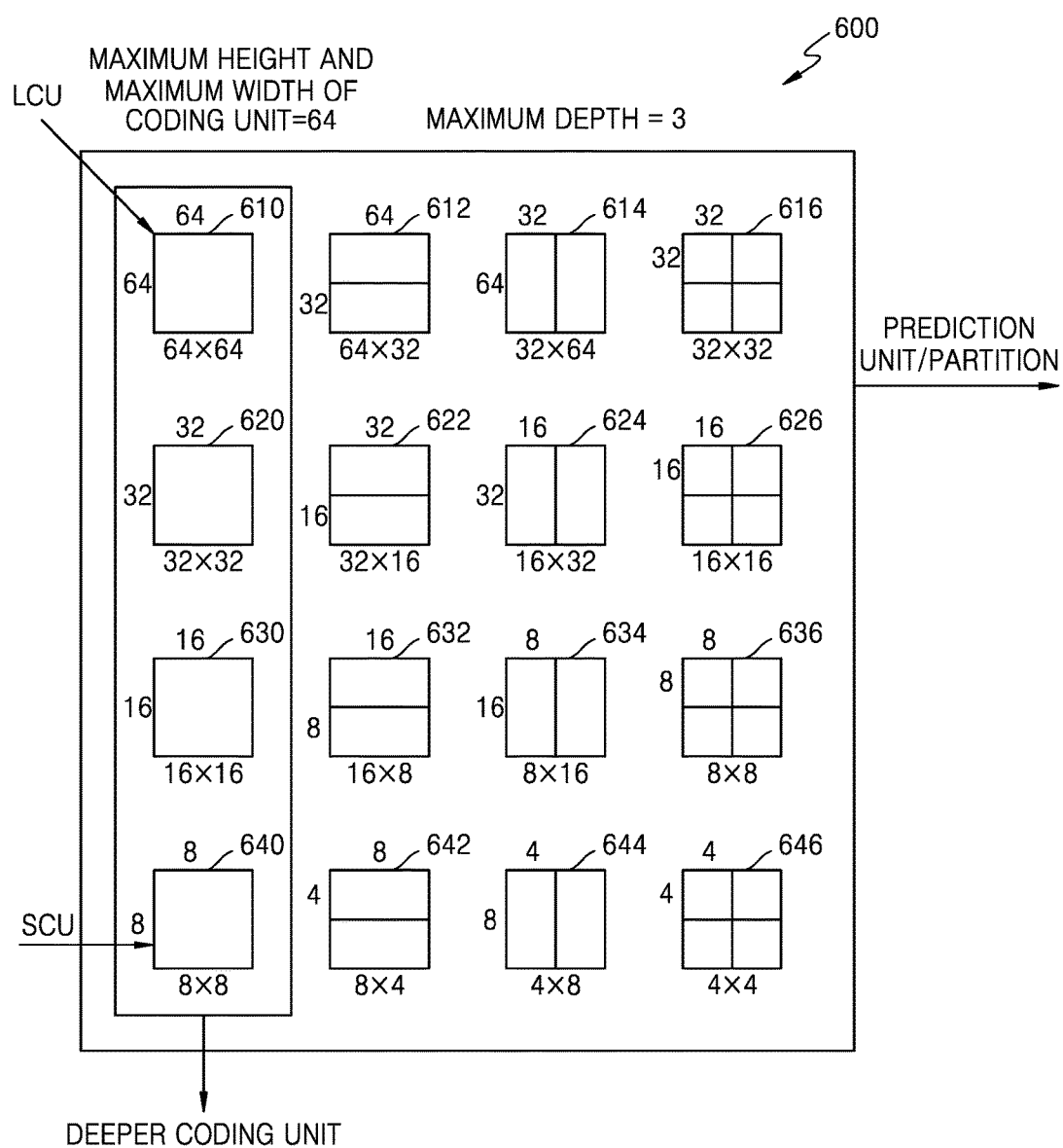
FIG. 12 illustrates deeper coding units according to depths, and partitions, according to various embodiments.

FIG. 12 illustrates deeper coding units according to depths, and partitions, according to various embodiments.

The video encoding apparatus 100 according to an embodiment and the video decoding apparatus 200 according to an embodiment use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 600 according to an embodiment, the maximum height and the maximum width of the coding units are each 64, and the maximum depth is 3. In this case, the maximum depth represents a total number of times the coding unit is split from the largest coding unit to the smallest coding unit. Since a depth deepens along a vertical axis of the hierarchical structure of coding units 600, a height and a width of the deeper coding unit are each split. Also, a prediction unit and partitions, which are bases for prediction encoding of each deeper coding unit, are shown along a horizontal axis of the hierarchical structure of coding units 600.

That is, a coding unit 610 is a largest coding unit in the hierarchical structure of coding units 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having the size of 8×8 and the depth of 3 is a smallest coding unit.

The prediction unit and the partitions of a coding unit are arranged along the horizontal axis according to each depth. That is, if the coding unit 610 having a size of 64×64 and a depth of 0 is a prediction unit, the prediction unit may be split into partitions included in the coding unit 610 having the size of 64×64, i.e. a partition 610 having a size of 64×64, partitions 612 having the size of 64×32, partitions 614 having the size of 32×64, or partitions 616 having the size of 32×32.

Equally, a prediction unit of the coding unit 620 having the size of 32×32 and the depth of 1 may be split into partitions included in the coding unit 620 having the size of 32×32, i.e. a partition 620 having a size of 32×32, partitions 622 having a size of 32×16, partitions 624 having a size of 16×32, and partitions 626 having a size of 16×16.

Equally, a prediction unit of the coding unit 630 having the size of 16×16 and the depth of 2 may be split into partitions included in the coding unit 630 having the size of 16×16, i.e. a partition 630 having a size of 16×16, partitions 632 having a size of 16×8, partitions 634 having a size of 8×16, and partitions 636 having a size of 8×8.

Equally, a prediction unit of the coding unit 640 having the size of 8×8 and the depth of 3 may be split into partitions included in the coding unit 640 having the size of 8×8, i.e. a partition 640 having a size of 8×8, partitions 642 having a size of 8×4, partitions 644 having a size of 4×8, and partitions 646 having a size of 4×4.

In order to determine a depth of the largest coding unit 610, the coding unit determiner 120 of the video encoding apparatus 100 has to perform encoding on coding units respectively corresponding to depths included in the largest coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare results of encoding the same data according to depths, the data has to be encoded by using each of the coding unit corresponding to the depth of 1 and four coding units corresponding to the depth of 2.

In order to perform encoding according to each of the depths, a least encoding error that is a representative encoding error of a corresponding depth may be selected by performing encoding on each of prediction units of the coding units according to depths, along the horizontal axis of the hierarchical structure of coding units 600. Also, the minimum encoding error may be searched for by comparing representative encoding errors according to depths, by performing encoding for each depth as the depth deepens along the vertical axis of the hierarchical structure of coding units 600. A depth and a partition generating the minimum encoding error in the largest coding unit 610 may be selected as a depth and a partition mode of the largest coding unit 610.

Figure 13:
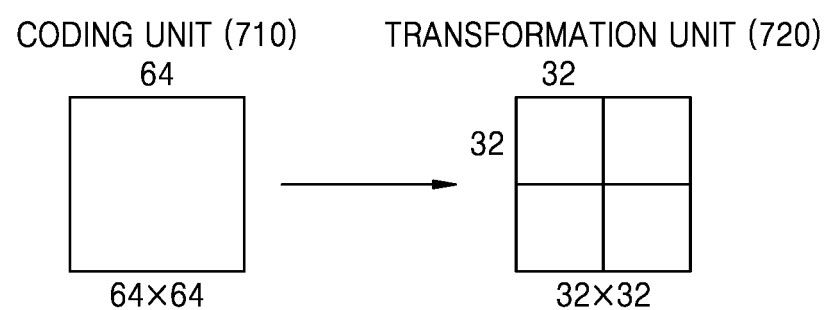
FIG. 13 illustrates a relationship between a coding unit and transformation units, according to various embodiments.

FIG. 13 illustrates a relationship between a coding unit and transformation units, according to various embodiments.

The video encoding apparatus 100 according to an embodiment or the video decoding apparatus 200 according to an embodiment encodes or decodes an image according to coding units having sizes smaller than or equal to a largest coding unit for each largest coding unit. Sizes of transformation units for transformation during an encoding process may be selected based on data units that are not larger than a corresponding coding unit.

For example, in the video encoding apparatus 100 or the video decoding apparatus 200, when a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error with respect to an original image may be selected.

Figure 14:
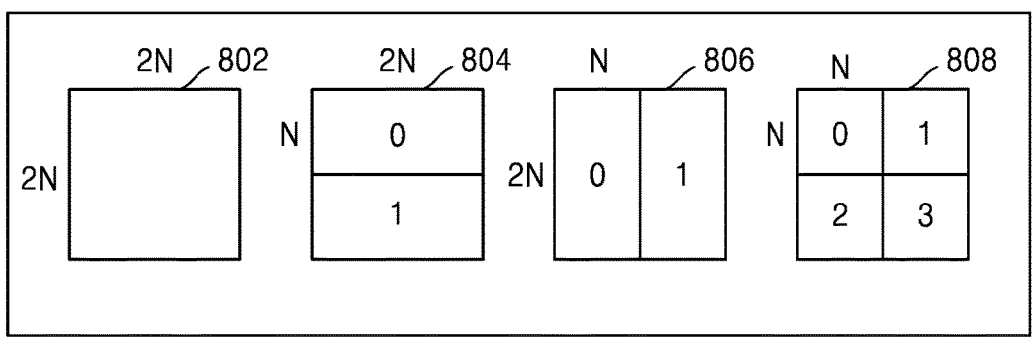
FIG. 14 illustrates a plurality of pieces of encoding information, according to various embodiments.
Figure 14:
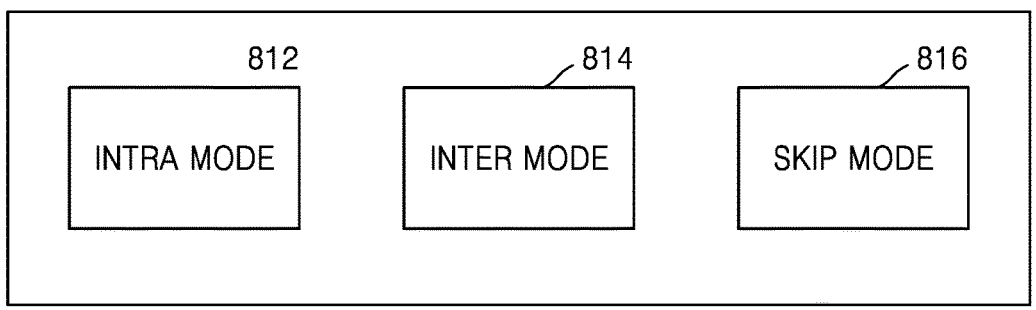
Figure 14:
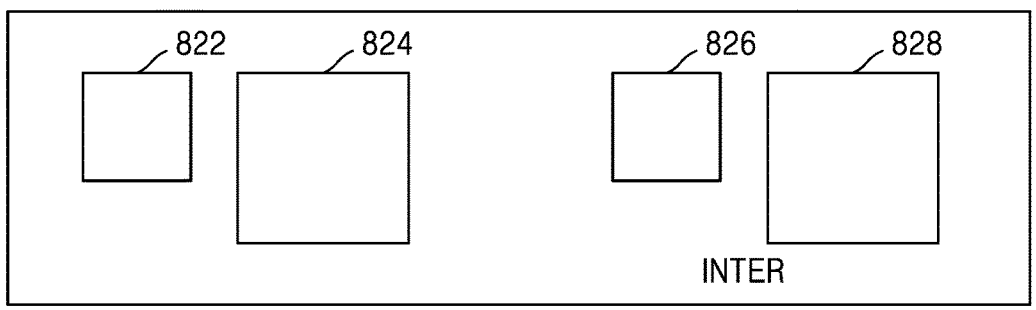

FIG. 14 illustrates a plurality of pieces of encoding information, according to various embodiments.

The output unit 130 of the video encoding apparatus 100 according to an embodiment may encode and transmit, as split information, partition mode information 800, prediction mode information 810, and transformation unit size information 820 for each coding unit corresponding to a depth.

The partition mode information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. In this case, the partition mode information 800 about a current coding unit is set to indicate one of the partition 802 having a size of 2N×2N, the partition 804 having a size of 2N×N, the partition 806 having a size of N×2N, and the partition 808 having a size of N×N.

The prediction mode information 810 indicates a prediction mode of each partition. For example, the prediction mode information 810 may indicate a mode of prediction encoding performed on a partition indicated by the partition mode information 800, i.e., an intra mode 812, an inter mode 814, or a skip mode 816.

The transformation unit size information 820 represents a transformation unit to be based on when transformation is performed on a current coding unit. For example, the transformation unit may be one of a first intra transformation unit 822, a second intra transformation unit 824, a first inter transformation unit 826, and a second inter transformation unit 828.

The image data and encoding information extractor 210 of the video decoding apparatus 200 may extract and use the partition mode information 800, the prediction mode information 810, and the transformation unit size information 820 for decoding, according to each deeper coding unit.

Figure 15:
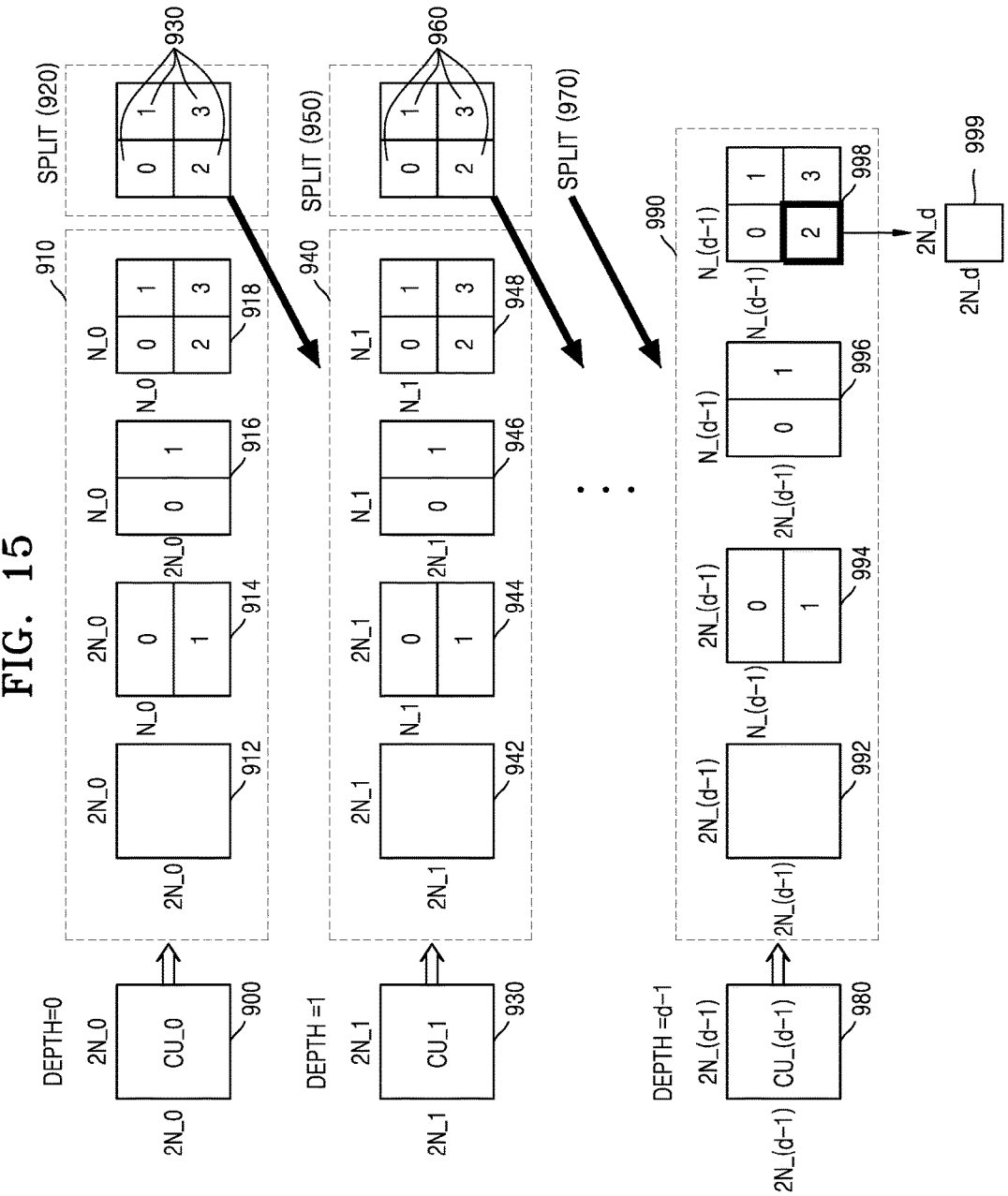
FIG. 15 illustrates deeper coding units according to depths, according to various embodiments.

FIG. 15 illustrates deeper coding units according to depths, according to various embodiments.

Split information may be used to represent a change in a depth. The spilt information specifies whether a coding unit of a current depth is split into coding units of a lower depth.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0×N_0, a partition mode 916 having a size of N_0×2N_0, and a partition mode 918 having a size of N_0×N_0. Only the partition modes 912, 914, 916, and 918 which are obtained by symmetrically splitting the prediction unit are illustrated, but as described above, a partition mode is not limited thereto and may include asymmetrical partitions, partitions having a predetermined shape, and partitions having a geometrical shape.

According to each partition mode, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition modes 912, 914, and 916 having the sizes of 2N_0×2N_0, 2N_0×N_0 and N_0×2N_0, the prediction unit 910 may not be split into a lower depth.

If the encoding error is the smallest in the partition mode 918 having the size of N_0×N_0, a depth is changed from 0 to 1 and split is performed (operation 920), and encoding may be repeatedly performed on coding units 930 of a partition mode having a depth of 2 and a size of N_0×N_0 so as to search for a minimum encoding error.

A prediction unit 930 for prediction encoding the coding unit 930 having a depth of 1 and a size of 2N_1×2N_1 (=N_0×N_0) may include a partition mode 942 having a size of 2N_1×2N_1, a partition mode 944 having a size of 2N_1×N_1, a partition mode 946 having a size of N_1×2N_1, and a partition mode 948 having a size of N_1×N_1.

If an encoding error is the smallest in the partition mode 948 having the size of N_1×N_1, a depth is changed from 1 to 2 and split is performed (in operation 950), and encoding is repeatedly performed on coding units 960 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−2. That is, when encoding is performed up to when the depth is d−1 after a coding unit corresponding to a depth of d−2 is split (in operation 970), a prediction unit 990 for prediction encoding a coding unit 980 having a depth of d−1 and a size of 2N_(d−1)×2N_(d−1) may include partitions of a partition mode 992 having a size of 2N_(d−

1)×2N_(d−1), a partition mode 994 having a size of 2N_(d−1)×N_(d−1), a partition mode 996 having a size of N_(d−1)×2N_(d−1), and a partition mode 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes so as to search for a partition mode generating a minimum encoding error.

Even when the partition type 998 having the size of N_(d−1)×N_(d−1) has the minimum encoding error, since a maximum depth is d, a coding unit CU_(d−1) having a depth of d−1 is no longer split into a lower depth, and a depth for the coding units constituting a current largest coding unit 900 is determined to be d−1 and a partition mode of the current largest coding unit 900 may be determined to be N_(d−1)×N_(d−1). Also, since the maximum depth is d, split information for a coding unit 952 having a depth of d−1 is not set.

A data unit 999 may be a 'minimum unit' for the current largest coding unit. A minimum unit according to the embodiment may be a square data unit obtained by splitting a smallest coding unit having a lowermost depth by 4. By performing the encoding repeatedly, the video encoding apparatus 100 according to the embodiment may select a depth having the least encoding error by comparing encoding errors according to depths of the coding unit 900 to determine a depth, and set a corresponding partition mode and a prediction mode as an encoding mode of the depth.

As such, the minimum encoding errors according to depths are compared in all of the depths of 0, 1, . . . , d−1, d, and a depth having the least encoding error may be determined as a depth. The depth, the partition mode of the prediction unit, and the prediction mode may be encoded and transmitted as split information. Also, since a coding unit has to be split from a depth of 0 to a depth, only split information of the depth is set to '0', and split information of depths excluding the depth is set to '1'.

The image data and encoding information extractor 220 of the video decoding apparatus 200 according to the embodiment may extract and use a depth and prediction unit information about the coding unit 900 so as to decode the coding unit 912. The video decoding apparatus 200 according to the embodiment may determine a depth, in which split information is '0', as a depth by using split information according to depths, and may use, for decoding, split information about the corresponding depth.

Figure 16:
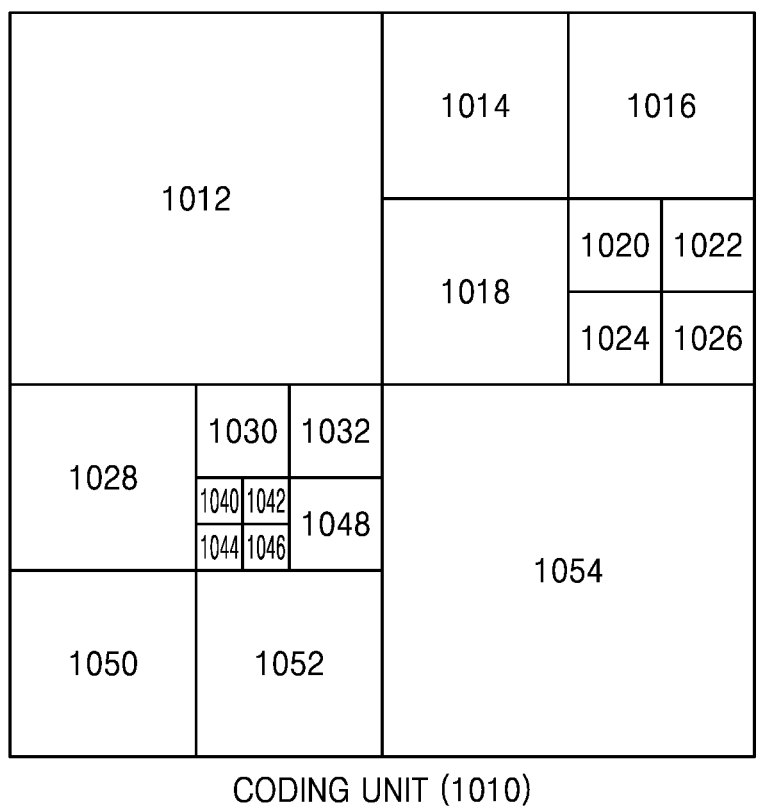
FIGS. 16, 17, and 18 illustrate a relationship between coding units, prediction units, and transformation units, according to various embodiments.
Figure 17:
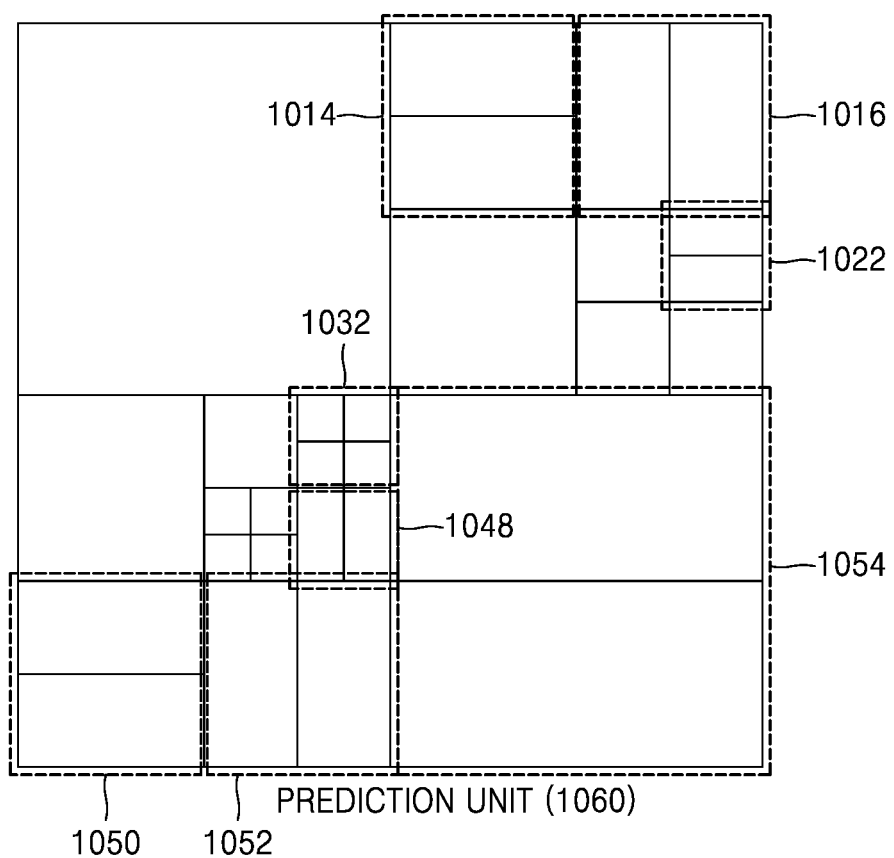
Figure 18:
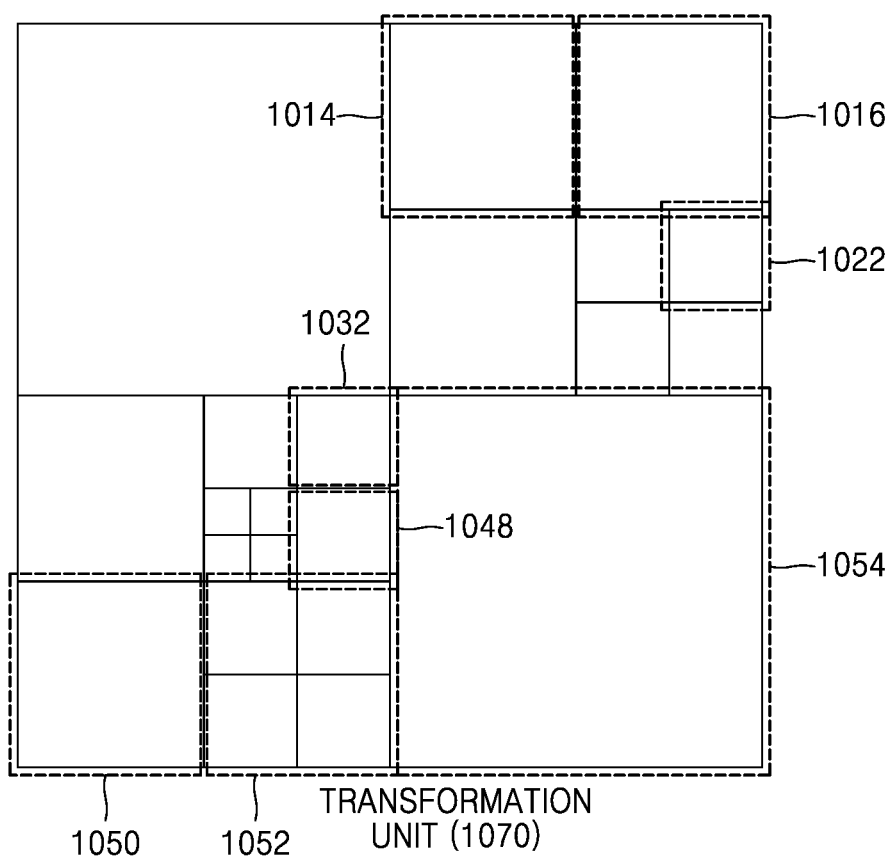

FIGS. 16, 17, and 18 illustrate a relationship between coding units, prediction units, and transformation units, according to various embodiments.

Coding units 1010 are deeper coding units according to depths determined by the video encoding apparatus 100, in a largest coding unit. Prediction units 1060 are partitions of prediction units of each of the coding units 1010 according to depths, and transformation units 1070 are transformation units of each of the coding units according to depths.

When a depth of a largest coding unit is 0 in the deeper coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

Some partitions 1014, 1016, 1022, 1032, 1048, 1050, 1052, and 1054 from among the prediction units 1060 are obtained by splitting the coding unit. That is, partitions 1014, 1022, 1050, and 1054 are a partition mode having a size of 2N×N, partitions 1016, 1048, and 1052 are a partition mode having a size of N×2N, and a partition 1032 is a partition mode having a size of N×N. Prediction units and partitions of the deeper coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, 1052, and 1054 in the transformation units 1060 are data units different from those in the prediction units 1760 in terms of sizes and shapes. That is, the video encoding apparatus 100 and the video decoding apparatus 200 according to the embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit so as to determine an optimum coding unit, and thus coding units according to a recursive tree structure may be obtained. Encoding information may include split information about a coding unit, partition mode information, prediction mode information, and transformation unit size information. Table 1 below shows the encoding information that may be set by the video encoding apparatus 100 and the video decoding apparatus 200 according to the embodiments.

TABLE 1

Split Information 0
(Encoding on Coding Unit having Size of 2N × 2N and Current Depth of d)

| | | | Size of Transformation Unit | | |
|---|---|---|---|---|---|
| | Partition Type | | Split Information 0 of Transformation Unit | Split Information 1 of Transformation Unit | |
| Prediction Mode | Symmetrical Partition Type | Asymmetrical Partition Type | | | Split Information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Partition Type) N/2 × N/2 (Asymmetrical Partition Type) | Repeatedly Encode Coding Units having Lower Depth of d + 1 |

The output unit 130 of the video encoding apparatus 100 according to the embodiment may output the encoding information about the coding units having a tree structure, and the image data and encoding information extractor 220 of the video decoding apparatus 200 according to the embodiment may extract the encoding information about the coding units having a tree structure from a received bitstream.

Split information specifies whether a current coding unit is split into coding units of a lower depth. If split information of a current depth d is 0, a depth, in which a current coding unit is no longer split into a lower depth, is a depth, and thus partition mode information, prediction mode information, and transformation unit size information may be defined for the depth. If the current coding unit has to be further split according to the split information, encoding has to be independently performed on each of four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The partition mode information may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

The encoding information about coding units having a tree structure according to the embodiment may be assigned to at least one of a coding unit of a depth, a prediction unit, and a minimum unit. The coding unit of the depth may include at least one of a prediction unit and a minimum unit containing the same encoding information.

Accordingly, it is determined whether adjacent data units are included in the same coding unit corresponding to the depth by comparing encoding information of the adjacent data units. Also, a corresponding coding unit corresponding to a depth is determined by using encoding information of a data unit, and thus a distribution of depths in a largest coding unit may be inferred.

Accordingly, if a current coding unit is predicted based on encoding information of adjacent data units, encoding information of data units in deeper coding units adjacent to the current coding unit may be directly referred to and used.

In another embodiment, if a current coding unit is predicted based on encoding information of adjacent data units, data units adjacent to the current coding unit may be searched by using encoded information of the data units, and the searched adjacent coding units may be referred for predicting the current coding unit.

Figure 19:
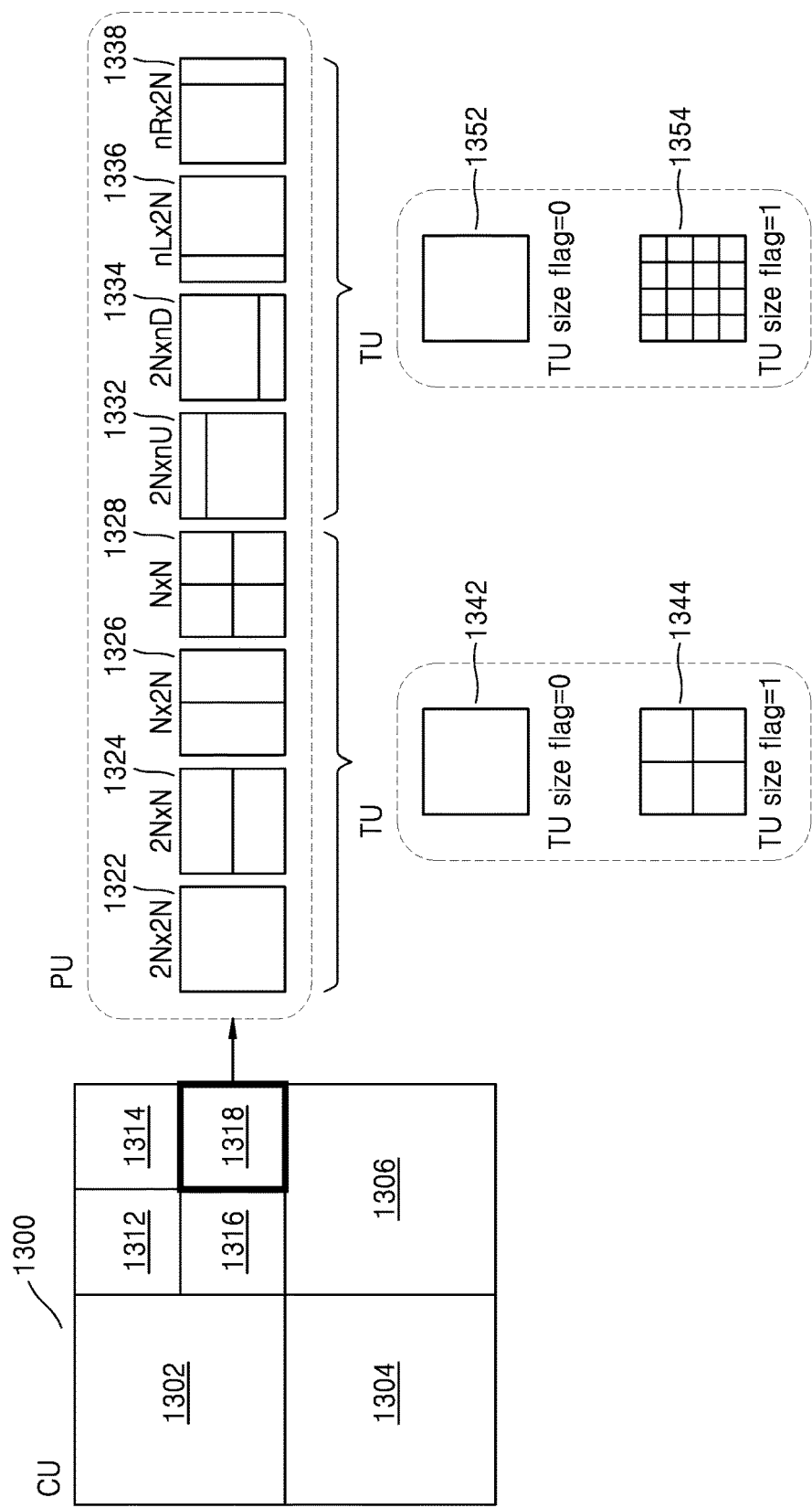
FIG. 19 illustrates a relationship between a coding unit, a prediction unit, and a transformation unit, according to encoding mode information of Table 1.

FIG. 19 illustrates a relationship between a coding unit, a prediction unit, and a transformation unit, according to the encoding mode information of Table 1.

A largest coding unit 1300 includes coding units 1302, 1304, 1306, 1312, 1314, 1316, and 1318 of depths. Here, since the coding unit 1318 is a coding unit of a depth, split information may be set to O. Partition mode information of the coding unit 1318 having a size of 2N×2N may be set to be one of partition modes including 2N×2N 1322, 2N×N 1324, N×2N 1326, N×N 1328, 2N×nU 1332, 2N×nD 1334, nL×2N 1336, and nR×2N 1338.

Transformation unit split information (TU size flag) is a type of a transformation index, and a size of a transformation unit corresponding to the transformation index may be changed according to a prediction unit type or partition mode of the coding unit.

For example, when the partition mode information is set to be one of symmetrical partition modes 2N×2N 1322, 2N×N 1324, N×2N 1326, and N×N 1328, if the transformation unit split information is 0, a transformation unit 1342 having a size of 2N×2N is set, and if the transformation unit split information is 1, a transformation unit 1344 having a size of N×N may be set.

When the partition mode information is set to be one of asymmetrical partition modes 2N×nU 1332, 2N×nD 1334, nL×2N 1336, and nR×2N 1338, if the transformation unit split information (TU size flag) is 0, a transformation unit 1352 having a size of 2N×2N may be set, and if the transformation unit split information is 1, a transformation unit 1354 having a size of N/2×N/2 may be set.

The transformation unit split information (TU size flag) described above with reference to FIG. 18 is a flag having a value or 0 or 1, but the transformation unit split information according to an embodiment is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 100 according to the embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 200 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be smaller than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$CurrMinTuSize = max(MinTransformSize, RootTuSize/(2^{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, in Equation (1), 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then RootTuSize' may be determined by using Equation (2) below. In Equation (2), 'MaxTransformSize' denotes a maximum transformation unit size, and 'PUSize' denotes a current prediction unit size.

$$RootTuSize = min(MaxTransformSize, PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize = min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 7 through 19, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and picture sequences may be reconstructed. The reconstructed video may be reproduced by a reproducing apparatus, may be stored in a storage medium, or may be transmitted via a network.

The aforementioned embodiments may be written as computer programs and may be implemented in general-use digital computers that execute the programs by using a computer-readable recording medium. Examples of the computer-readable recording medium include magnetic storage media (e.g., ROM, floppy disks, hard disks, etc.), optical recording media (e.g., CD-ROMs, or DVDs), etc.

For convenience of description, the inter-view video encoding methods and/or the inter-view video encoding method, which are described with reference to FIGS. 1A through 19, will be collectively referred to as 'the video encoding method of the present invention'. Also, the inter-view video decoding methods and/or the inter-view video decoding method, which are described with reference to FIGS. 1A through 19, will be collectively referred to as 'the video decoding method of the present invention'.

Also, a video encoding apparatus including the inter-view video encoding apparatus 10, the video encoding apparatus 100 or the image encoder 400 which are described with reference to FIGS. 1A through 19 will be collectively referred to as a 'video encoding apparatus of the present invention'. Also, a video decoding apparatus including the inter-view video decoding apparatus 20, the video decoding apparatus 200, or the image decoder 500 which are described with reference to FIGS. 1A through 19 will be collectively referred to as a 'video decoding apparatus of the present invention'.

The computer-readable recording medium such as a disc 26000 that stores the programs according to an embodiment will now be described in detail.

Figure 20:
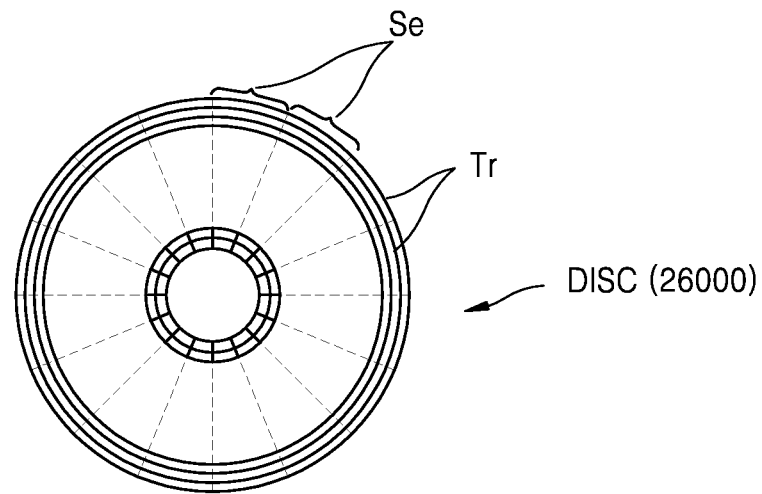
FIG. 20 illustrates a physical structure of a disc 26000 in which a program is stored, according to various embodiments.

FIG. 20 illustrates a physical structure of the disc 26000 in which a program is stored, according to various embodiments.

The disc 26000 described as the storage medium may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using the storage medium that stores the program for executing the video encoding method and the video decoding method as described above will now be described with reference to FIG. 22.

Figure 21:
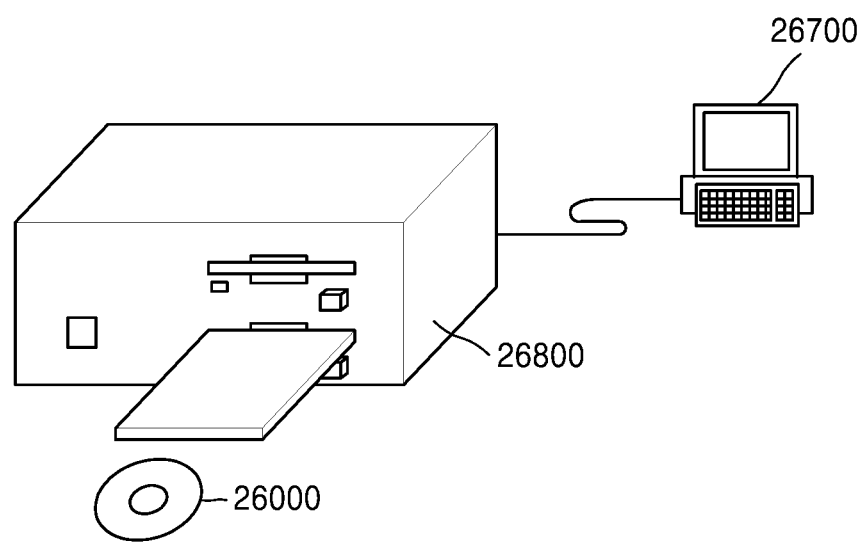
FIG. 21 illustrates a disc drive 26800 for recording and reading a program by using the disc 26000.

FIG. 21 illustrates a disc drive 26800 for recording and reading a program by using the disc 26000.

A computer system 26700 may store a program that executes at least one of the video encoding method and the video decoding method of the present invention, in the disc 26000 via the disc drive 26800. In order to run the program stored in the disc 26000 in the computer system 26700, the program may be read from the disc 26000 and may be transmitted to the computer system 26700 by using the disc drive 26800.

The program that executes at least one of the video encoding method and the video decoding method of the present invention may be stored not only in the disc 26000 illustrated in FIGS. 20 and 21 but may also be stored in a memory card, a ROM cassette, or a solid state drive (SSD).

A system to which the video encoding method and the video decoding method according to the embodiments described above are applied will be described below.

Figure 22:
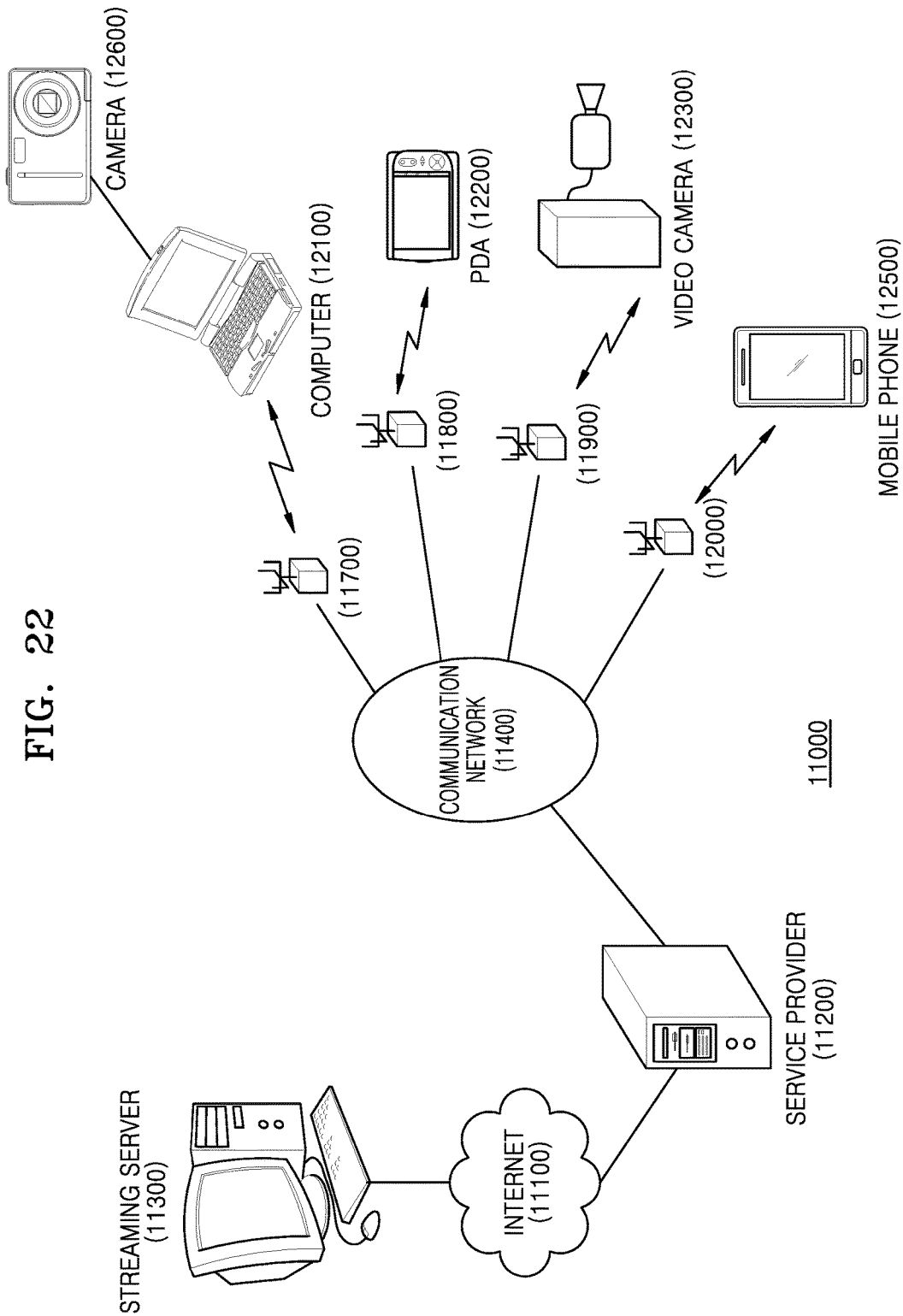
FIG. 22 illustrates an overall structure of a content supply system 11000 for providing a content distribution service.

FIG. 22 illustrates an overall structure of a content supply system 11000 for providing a content distribution service.

A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

Figure 24:
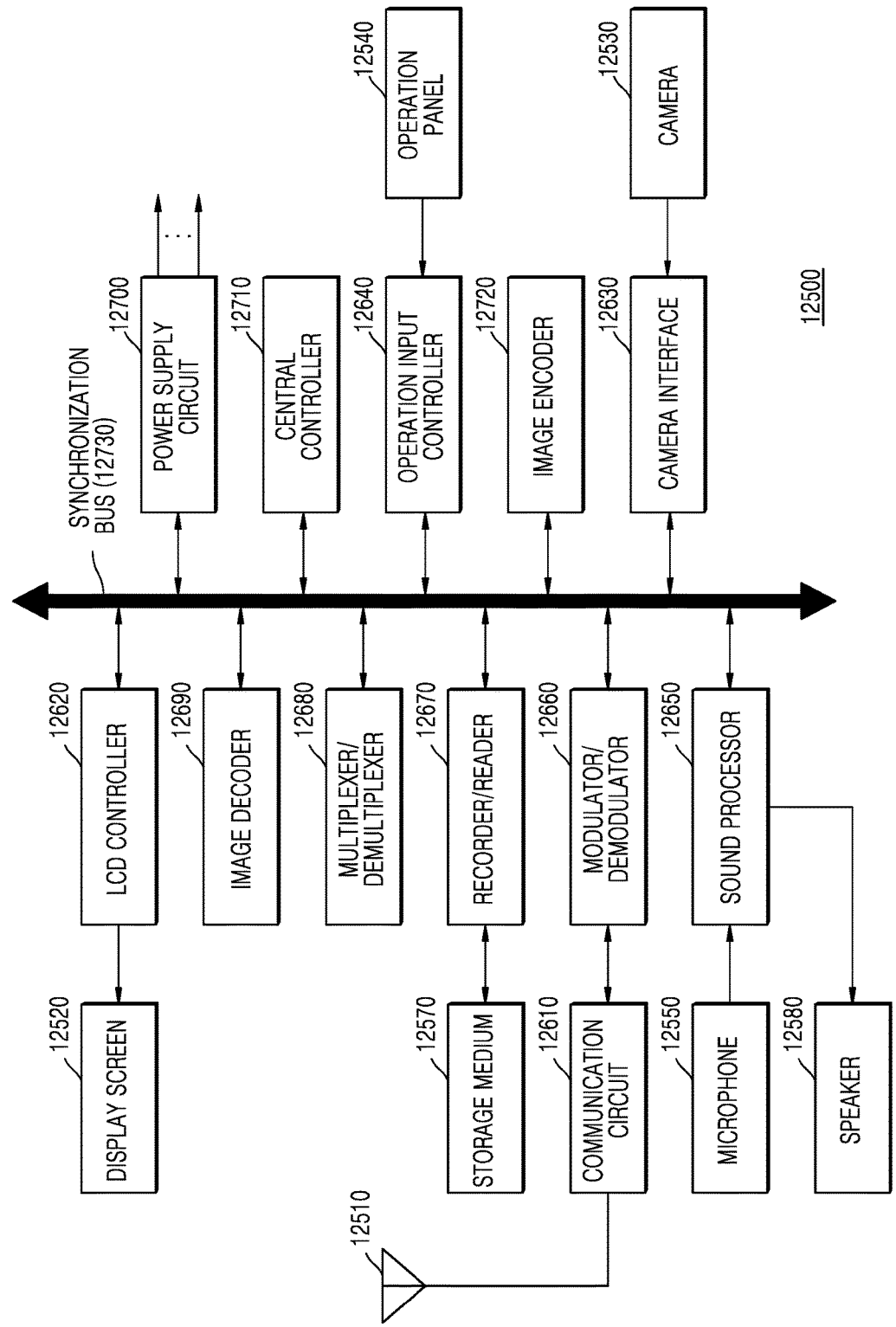
FIG. 24 illustrates an internal structure of the mobile phone 12500 to which a video encoding method and a video decoding method of the present invention are applied, according to various embodiments.

However, the content supply system 11000 is not limited to as illustrated in FIG. 24, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessed by the computer 12100.

If video is captured by a camera mounted in the mobile phone 12500, video data may be received from the mobile phone 12500.

The video data may be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and may transmit the encoded content data to the streaming server 11300. The streaming server 11300 may transmit the encoded content data in a type of streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

The video encoding apparatus and the video decoding apparatus of the present invention may be applied to encoding and decoding operations of the plurality of independent devices included in the content supply system 11000.

Figure 23:
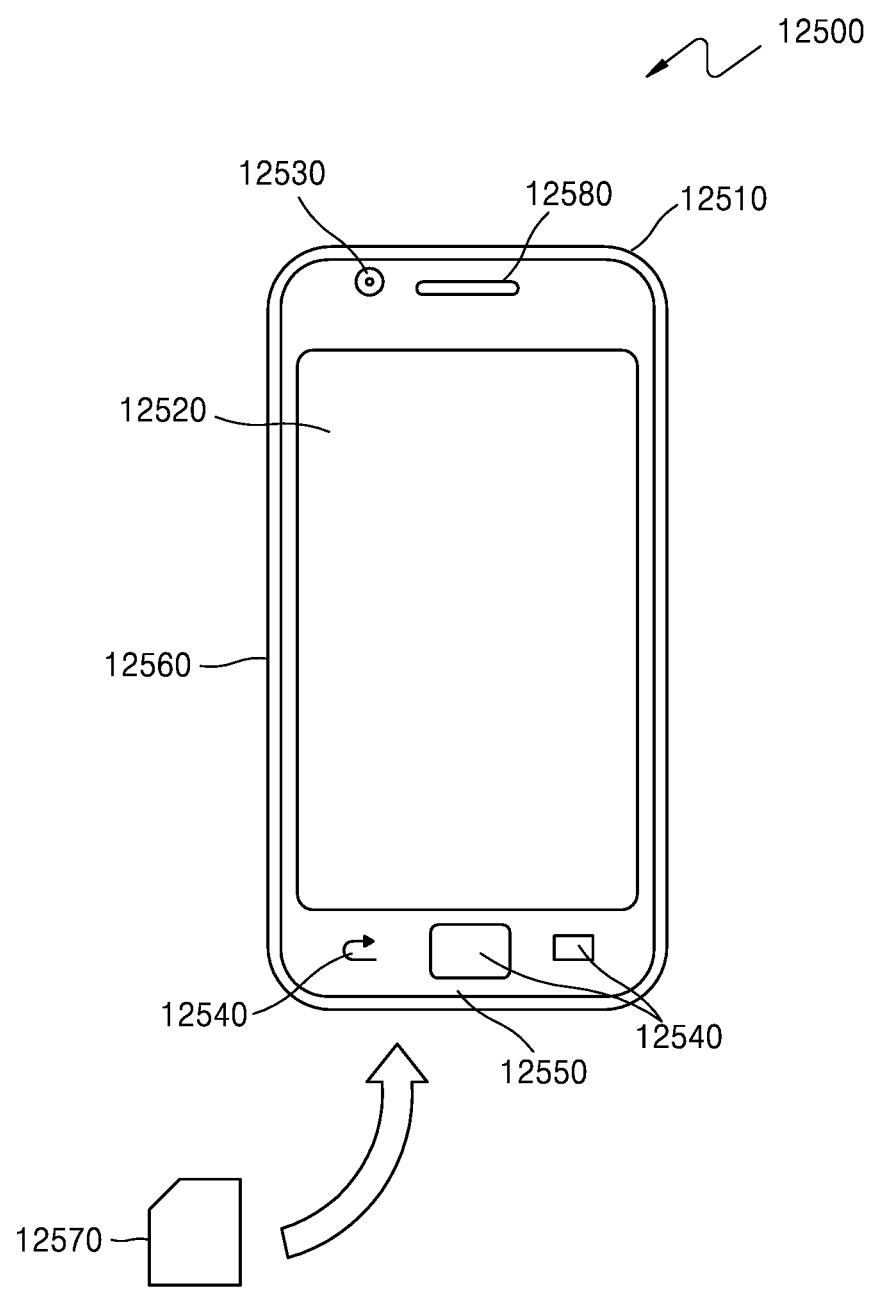
FIG. 23 illustrates an external structure of a mobile phone 12500 to which a video encoding method and a video decoding method of the present invention are applied, according to various embodiments.

With reference to FIGS. 23 and 24, the mobile phone 12500 included in the content supply system 11000 according to an embodiment will now be described in detail.

FIG. 23 illustrates an external structure of the mobile phone 12500 to which the video encoding apparatus and the video decoding apparatus of the present invention are applied, according to various embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

FIG. 24 illustrates an internal structure of the mobile phone 12500. In order to systemically control each of parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recorder/reader 12670, a modulator/demodulator 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 to an operation mode.

The central controller 12710 includes a CPU, a read-only memory (ROM), and a random access memory (RAM).

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulator/demodulator 12660 by control of the central controller 12710, the modulator/demodulator 12660 modulates a frequency band of the digital signal, and a communication circuit 12610 performs digital-to-analog (D/A) conversion and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650 under control of the central controller 12710. The digital sound signal may be transformed into a transformation signal via the modulator/demodulator 12660 and the communication circuit 12610, and may be transmitted via the antenna 12510.

When a text message, e.g., email, is transmitted during a data communication mode, text data of the text message is input via the operation panel 12540 and is transmitted to the central controller 12610 via the operation input controller 12640. By control of the central controller 12610, the text data is transformed into a transmission signal via the modulator/demodulator 12660 and the communication circuit 12610 and is transmitted to the wireless base station 12000 via the antenna 12510.

In order to transmit image data during the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the video encoding apparatus described above. The image encoder 12720 may transform the image data received from the camera 12530 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulator/demodulator 12660 and the communication circuit 12610, and may then be transmitted via the antenna 12510.

While the mobile phone 12500 receives communication data from the outside, frequency recovery and analog-to-digital (A/D) conversion are performed on a signal received via the antenna 12510 to transform the signal into a digital signal. The modulator/demodulator 12660 modulates a frequency band of the digital signal. The frequency-band modulated digital signal is transmitted to the image decoder 12690, the sound processor 12650, or the LCD controller 12620, according to the type of the digital signal.

During the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulator/demodulator 12660 and the sound processor 12650, and the analog sound signal is output via the speaker 12580, by control of the central controller 12710.

When during the data communication mode, data of a video file accessed at an Internet website is received, a signal received from the wireless base station 12000 via the antenna 12510 is output as multiplexed data via the modulator/demodulator 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the image decoder 12690 and the sound processor 12650, respectively.

A structure of the image decoder 12690 may correspond to that of the video decoding apparatus described above. The image decoder 12690 may decode the encoded video data to obtain reconstructed video data and provide the reconstructed video data to the display screen 12520 via the LCD controller, by using the aforementioned video decoding method of the present invention.

Thus, the video data of the video file accessed at the Internet website may be displayed on the display screen 12520. At the same time, the sound processor 12650 may transform audio data into an analog sound signal, and may provide the analog sound signal to the speaker 12580. Thus, audio data contained in the video file accessed at the Internet website may also be reproduced via the speaker 12580.

The mobile phone 12500 or another type of communication terminal may be a transceiving terminal including both the video encoding apparatus and the video decoding apparatus of the present invention, may be a transmitting terminal including only the video encoding apparatus of the present invention, or may be a receiving terminal including only the video decoding apparatus of the present invention.

Figure 25:
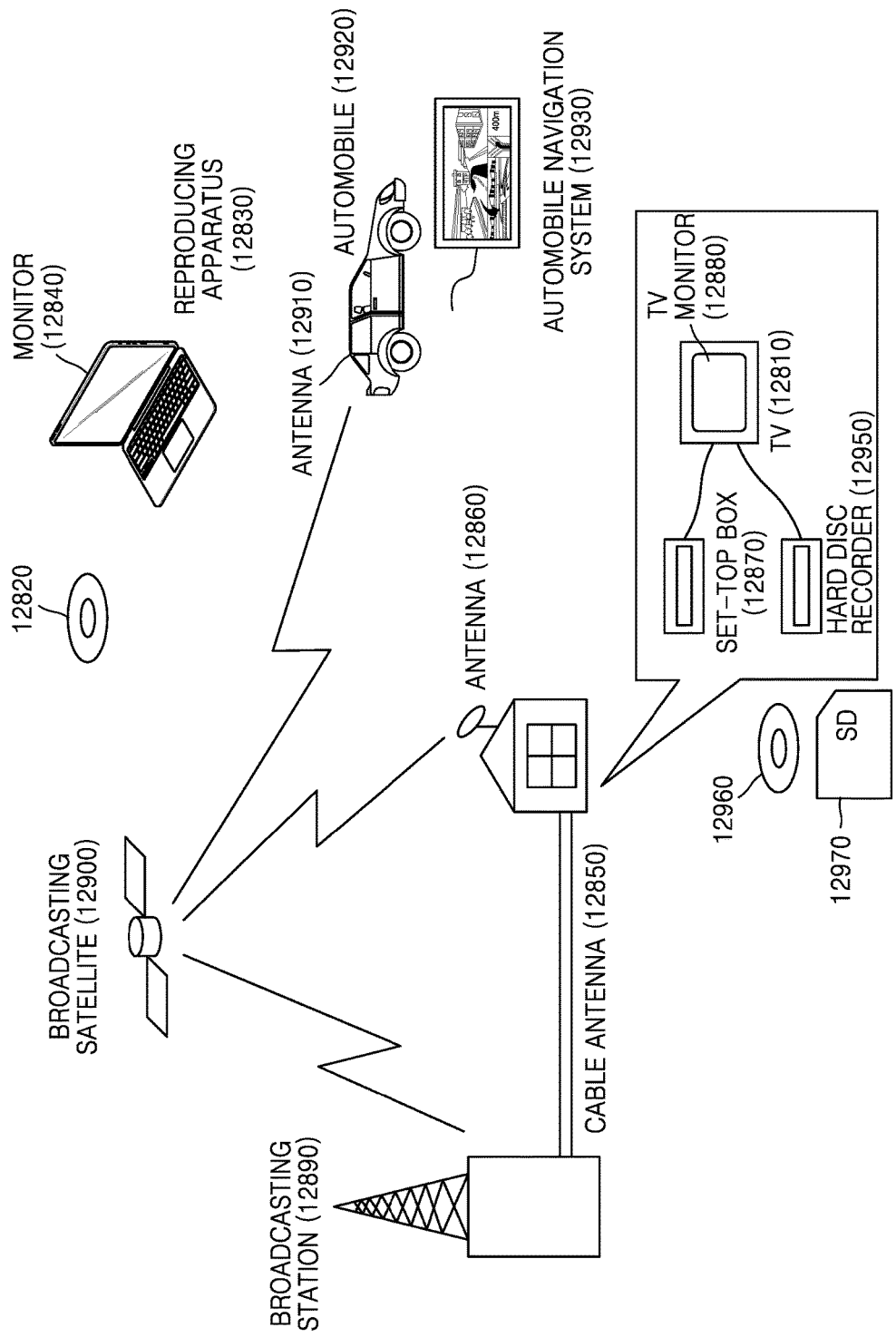
FIG. 25 illustrates a digital broadcasting system employing a communication system, according to the present invention.

A communication system of the present invention is not limited to the aforementioned communication system. For example, FIG. 25 illustrates a digital broadcasting system employing a communication system, according to various embodiments. The digital broadcasting system of FIG. 25 may receive a digital broadcast transmitted via a satellite or a terrestrial network by using the video encoding apparatus and the video decoding apparatus of the present invention.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus of the present invention is implemented in a reproducing apparatus 12830, the reproducing apparatus 12830 may parse and decode an encoded video stream recorded on a storage medium 12820 such as a disc or a memory card so as to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus of the present invention may be installed. Data output from the set-top box 12870 may also be reproduced on a TV monitor 12880.

As another example, the video decoding apparatus of the present invention may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by the video encoding apparatus of the present invention and may then be recorded to and stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus according to the exemplary embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoder 12720 of FIG. 22. For example, the computer 12100 and the TV receiver 12810 may not include the camera 12530, the camera interface 12630, and the image encoder 12720 of FIG. 22.

Figure 26:
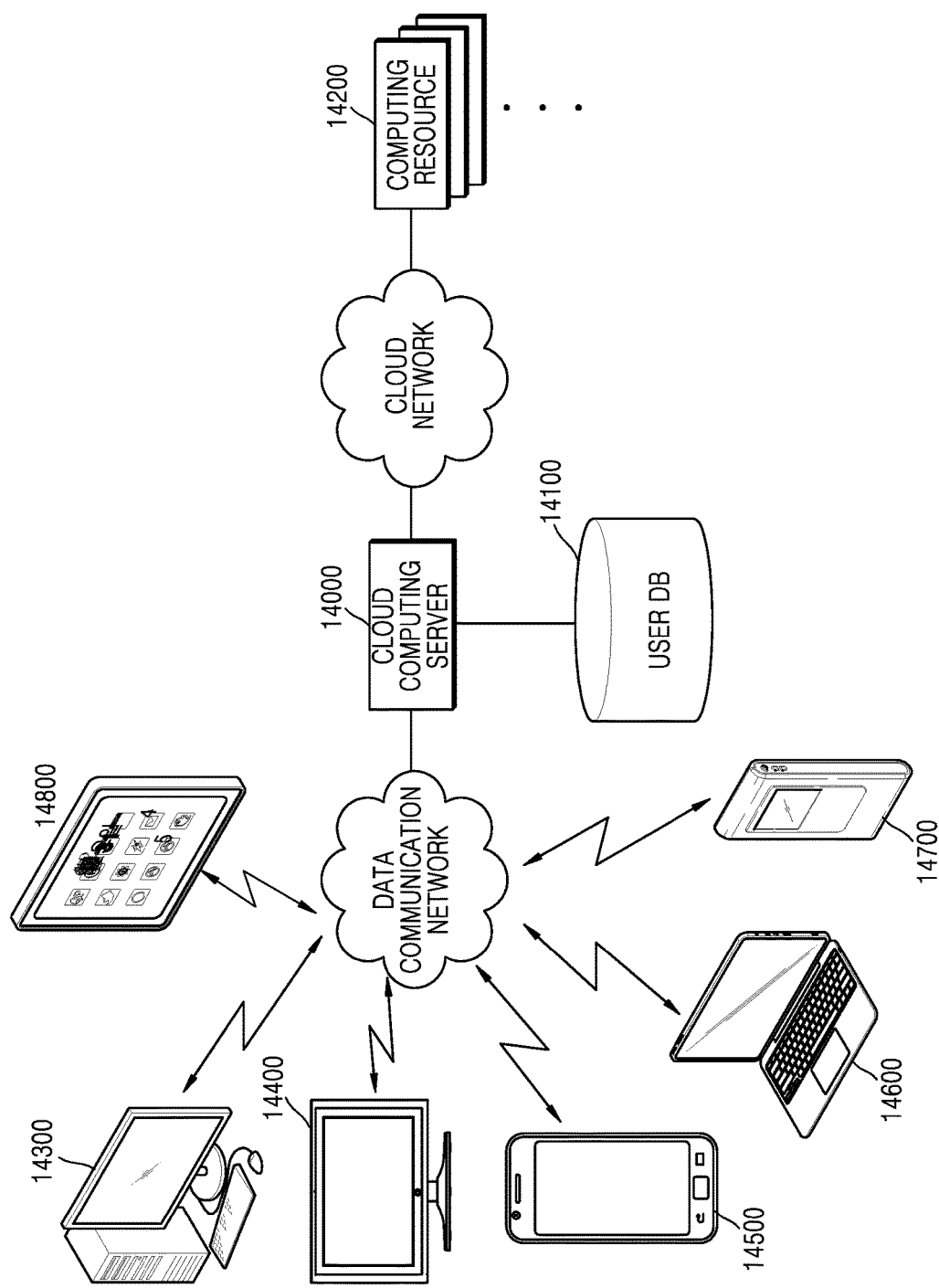
FIG. 26 illustrates a network structure of a cloud computing system using a video encoding apparatus and a video decoding apparatus, according to an embodiment of the present invention.

FIG. 26 illustrates a network structure of a cloud computing system using a video encoding apparatus and a video decoding apparatus, according to various embodiments.

The cloud computing system may include a cloud computing server 14100, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14100 via a data communication network including the Internet and a mobile telecommunication network. User terminals may be provided cloud computing services, and particularly video reproduction services, from the cloud computing server 14100. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14100 may combine the plurality of computing resources 14200 distributed in a cloud network and may provide user terminals with a result of combining. The plurality of computing resources 14200 may include various data services, and may include data uploaded from user terminals. As described above, the cloud computing server 14100 may provide user terminals with desired services by combining video database distributed in different regions according to the virtualization technology.

User information about users who have subscribed for a cloud computing service is stored in the user DB 14100. The user information may include log-in information, and personal credit information such as addresses, names, and the like. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14100 searches for and reproduces the video service, based on the user DB 14100. When the smart phone 14500 receives a video data stream from the cloud computing server 14100, a process of reproducing video by decoding the video data stream is similar to an operation of the mobile phone 12500 described above with reference to FIG. 24.

The cloud computing server 14100 may refer to a reproduction history of a desired video service, stored in the user DB 14100. For example, the cloud computing server 14100 receives a request to reproduce a video stored in the user DB 14100, from a user terminal. If this video was being reproduced, then a method of streaming this video, performed by the cloud computing server 14100, may vary according to the request from the user terminal, i.e., according to whether the video will be reproduced, starting from a start thereof or a pausing point thereof. For example, if the user terminal requests to reproduce the video, starting from the start thereof, the cloud computing server 14100 transmits streaming data of the video starting from a first frame thereof to the user terminal. On the other hand, if the user terminal requests to reproduce the video, starting from the pausing point thereof, the cloud computing server 14100 transmits streaming data of the video starting from a frame corresponding to the pausing point, to the user terminal.

Here, the user terminal may include the video decoding apparatus as described above with reference to FIGS. 1A through 19. As another example, the user terminal may include the video encoding apparatus as described above with reference to FIGS. 1A through 19. Alternatively, the user terminal may include both the video encoding apparatus and the video decoding apparatus as described above with reference to FIGS. 1A through 19.

Various applications of the video encoding method, the video decoding method, the video encoding apparatus, and the video decoding apparatus described above with reference to FIGS. 1A through 19 are described above with reference to FIGS. 20 through 25. However, various embodiments of methods of storing the video encoding method and the video decoding method in a storage medium or various embodiments of methods of implementing the video encoding apparatus and the video decoding apparatus in a device described above with reference to FIGS. 1A through 19 are not limited to the embodiments of FIGS. 20 through 26.

While the present invention has been particularly shown and described with reference to exemplary embodiments thereof, it will be understood by those of ordinary skill in the art that various changes in form and details may be made therein without departing from the spirit and scope of the following claims. The disclosed embodiments should be considered in a descriptive sense only and not for purposes of limitation. Therefore, the scope of the present invention is defined not by the detailed description of the present invention but by the appended claims, and all differences within the scope will be construed as being included in the present invention.

The invention claimed is:

1. An inter-view video decoding method comprising:
   determining a disparity vector of a current second-view depth block in a slice unit by using a camera parameter in the slice unit included a bitstream and a specific sample value selected within a sample value range determined based on a preset bit-depth;
   detecting a first-view depth block corresponding to the current second-view depth block by using the disparity vector; and
   reconstructing the current second-view depth block by generating a prediction block of the current second-view depth block based on coding information of the first-view depth block.

2. The inter-view video decoding method of claim 1, wherein the selected specific sample value is a median value among values comprised in the sample value range.

3. The inter-view video decoding method of claim 1, wherein the reconstructing of the current second-view depth block comprises:
   obtaining motion information of the current second-view depth block by using motion information of the first-view depth block; and
   reconstructing the current second-view depth block by performing motion compensation by using the motion information of the current second-view depth block.

4. An inter-view video decoding apparatus comprising:
   a disparity vector determiner for determining a disparity vector of a current second-view depth block in a slice unit by using a camera parameter in a slice unit included in a bitstream and a specific sample value selected within a sample value range determined based on a preset bit-depth; and
   an inter-view compensator for detecting a first-view depth block corresponding to the current second-view depth block by using the determined disparity vector, and reconstructing the current second-view depth block by generating a prediction block of the current second-view depth block based on coding information of the first-view depth block.

5. The inter-view video decoding apparatus of claim 4, wherein the selected specific sample value is a median value among values comprised in the sample value range.

6. The inter-view video decoding apparatus of claim 4, wherein the inter-view compensator obtains motion information of the current second-view depth block by using motion information of the first-view depth block, and reconstructs the current second-view depth block by performing motion compensation by using the motion information of the current second-view depth block.

7. An inter-view video encoding method comprising:
   determining a disparity vector of a current second-view depth block by using a camera parameter to be included in a slice unit and a specific sample value selected within a sample value range determined based on a preset bit-depth;
   detecting a first-view depth block corresponding to the current second-view depth block by using the determined disparity vector; and
   encoding the camera parameter in a slice unit included in a bitstream and encoding the current second-view depth block by generating a prediction block of the current second-view depth block based on coding information of the first-view depth block.

8. The inter-view video encoding method of claim 7, wherein the selected specific sample value is a median value among values comprised in the sample value range.

9. The inter-view video encoding method of claim 7, wherein the encoding of the current second-view depth block comprises:
   obtaining motion information of the current second-view depth block by using motion information of the first-view depth block; and
   encoding the current second-view depth block by performing motion prediction by using the motion information of the current second-view depth block.

10. A non-transitory computer-readable recording medium having recorded thereon a computer program for implementing the inter-view video decoding method of claim 1.

11. A non-transitory computer-readable recording medium having recorded thereon a computer program for implementing the inter-view video encoding method of claim 7.

* * * * *